US009319450B2

(12) United States Patent
Daly et al.

(10) Patent No.: US 9,319,450 B2
(45) Date of Patent: Apr. 19, 2016

(54) EMERGENCY ALERT MESSAGES VIA SOCIAL MEDIA

(71) Applicant: AT&T INTELLECTUAL PROPERTY I, L.P., Atlanta, GA (US)

(72) Inventors: Brian Kevin Daly, Peachtree Corners, GA (US); Charles Peter Musgrove, Henderson, NV (US); DeWayne A. Sennett, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 308 days.

(21) Appl. No.: 13/710,270

(22) Filed: Dec. 10, 2012

(65) Prior Publication Data

US 2014/0164505 A1 Jun. 12, 2014

(51) Int. Cl.
| | |
|---|---|
| G06F 15/16 | (2006.01) |
| H04L 29/08 | (2006.01) |
| G08B 27/00 | (2006.01) |
| H04L 12/58 | (2006.01) |
| H04L 12/18 | (2006.01) |
| G06Q 10/10 | (2012.01) |
| G06Q 50/00 | (2012.01) |

(52) U.S. Cl.
CPC ............... *H04L 67/02* (2013.01); *G06Q 10/10* (2013.01); *G06Q 50/01* (2013.01); *G08B 27/005* (2013.01); *H04L 12/1895* (2013.01); *H04L 51/32* (2013.01)

(58) Field of Classification Search
CPC ... H04L 12/58; H04L 12/588; H04L 12/1895; H04L 67/02; H04L 51/32; G06Q 10/10; G06Q 60/01; G08B 27/005

USPC .................................. 709/204, 206, 207, 224
See application file for complete search history.

(56) References Cited

U.S. PATENT DOCUMENTS

| | | | |
|---|---|---|---|
| 7,669,123 B2 | 2/2010 | Zuckerberg et al. | |
| 8,019,689 B1 * | 9/2011 | Nachenberg | 705/64 |
| 8,056,128 B1 * | 11/2011 | Dingle et al. | 726/22 |
| 8,352,970 B2 | 1/2013 | Brown et al. | |
| 8,837,685 B2 * | 9/2014 | Amerling et al. | 379/45 |
| 2006/0041891 A1 * | 2/2006 | Aaron | 719/315 |
| 2007/0255807 A1 | 11/2007 | Hayashi et al. | |
| 2009/0325535 A1 * | 12/2009 | Felt et al. | 455/404.1 |
| 2010/0161727 A1 * | 6/2010 | Shaffer et al. | 709/204 |
| 2010/0241576 A1 | 9/2010 | Beeri | |

(Continued)

FOREIGN PATENT DOCUMENTS

| | | |
|---|---|---|
| WO | WO 2006/047879 | 5/2006 |
| WO | WO 2010/114569 | 10/2010 |

OTHER PUBLICATIONS

Agyeman et al., "Emergency Messaging with Social Media," Engineering & Public Policy Project and Social & Decision Sciences Senior Policy Analysis Project Report, Apr. 2012, 164 pages.

*Primary Examiner* — Jonathan Bui
(74) *Attorney, Agent, or Firm* — Baker & Hostetler LLP

(57) ABSTRACT

Social media may be utilized to facilitate distribution of emergency alert messages. An emergency alert server may receive an indication of emergency and generate an emergency alert message based on the indication. The emergency alert message may then be distributed via social media and/or other mediums. An indication of trustworthiness may be incorporated in the emergency alert message. The indication of trustworthiness may be validated by validation system.

20 Claims, 16 Drawing Sheets

(56) References Cited

U.S. PATENT DOCUMENTS

| | | |
|---|---|---|
| 2010/0262699 A1* | 10/2010 | Bakker et al. ............... 709/227 |
| 2012/0197896 A1* | 8/2012 | Li et al. ..................... 707/740 |
| 2012/0254903 A1 | 10/2012 | Brown et al. |
| 2012/0256745 A1* | 10/2012 | Piett et al. ................. 340/540 |
| 2012/0290311 A1* | 11/2012 | Tara et al. ..................... 705/2 |
| 2012/0295579 A1* | 11/2012 | Miyano et al. ........... 455/404.2 |
| 2013/0073615 A1* | 3/2013 | Hall et al. ................... 709/203 |
| 2013/0104236 A1* | 4/2013 | Ray et al. ..................... 726/25 |
| 2013/0183924 A1* | 7/2013 | Saigh et al. .............. 455/404.2 |
| 2013/0272125 A1* | 10/2013 | Espina Perez et al. ...... 370/230 |
| 2013/0345530 A1* | 12/2013 | McRoberts et al. .......... 600/323 |
| 2014/0025724 A1* | 1/2014 | Granger et al. .............. 709/203 |
| 2014/0052680 A1* | 2/2014 | Nitz et al. ..................... 706/46 |
| 2014/0087780 A1* | 3/2014 | Abhyanker et al. .......... 455/521 |

* cited by examiner

EMERGENCY ALERT MESSAGES VIA SOCIAL MEDIA

TECHNICAL FIELD

The technical field generally relates to public safety, and more specifically relates to managing, distributing, and validating emergency alert messages via social media.

BACKGROUND

The wireless Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. To receive EAS messages, typically, a subscriber registers with a communications network via a mobile switching center (MSC). An MSC performs functions such as registration, authentication, location updating, handovers, and call routing. One MSC can support multiple cellular sites. Cellular sites can provide EAS messages on different channels. Unfortunately, if a subscriber of EAS alert messages is not paying attention to a communications mode, such as email or SMS, sending the subscriber an emergency alert via one of those communications modes may go unnoticed by the person.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

Social media may be utilized to distribute emergency alert messages. In an example embodiment, a processor may receive an indication of an emergency and generate an emergency alert message based on that indication. The processor may then distribute the emergency alert message via social media and other mediums. An indication of trustworthiness may be incorporated in an emergency alert message distributed via social media. In an example embodiment, the indication of trustworthiness in the emergency alert message may be validated by a third party, another system, or any appropriate entity. For example, emergency alert messages distributed via social media may be validated such that a recipient will be confident that the information can be trusted.

Social media may also be utilized to generate emergency alert messages. In an example embodiment, emergency alert messages distributed via social media may be correlated to update information that is distributed as an emergency alert to assess the validity of the emergency. In another example embodiment, an emergency alert message may be generated based on information correlated from social media. Emergency alert messages may also be updated based on feedback received from the recipient of the emergency alert message.

Social media also may be utilized to update the trustworthiness of the emergency alert message. In an example embodiment, trustworthiness of the emergency alert message may comprise validation of the information in the emergency alert message. In another example embodiment, trustworthiness of the emergency alert message may comprise validation of the source of the emergency alert message. Emergency alert messages distributed via social media for a particular area may be correlated to provide an indication of trustworthiness to emergency messages distributed via social media. In another example embodiment, emergency alert messages distributed via social media may be ranked and/or rated as to trustworthiness. The emergency alert messages may be updated to provide an updated indication of trustworthiness based on feedback received from the recipient of the message.

BRIEF DESCRIPTION OF THE DRAWINGS

Reference is made here to the accompanying drawings, which are not necessarily drawn to scale.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

Figure 1:
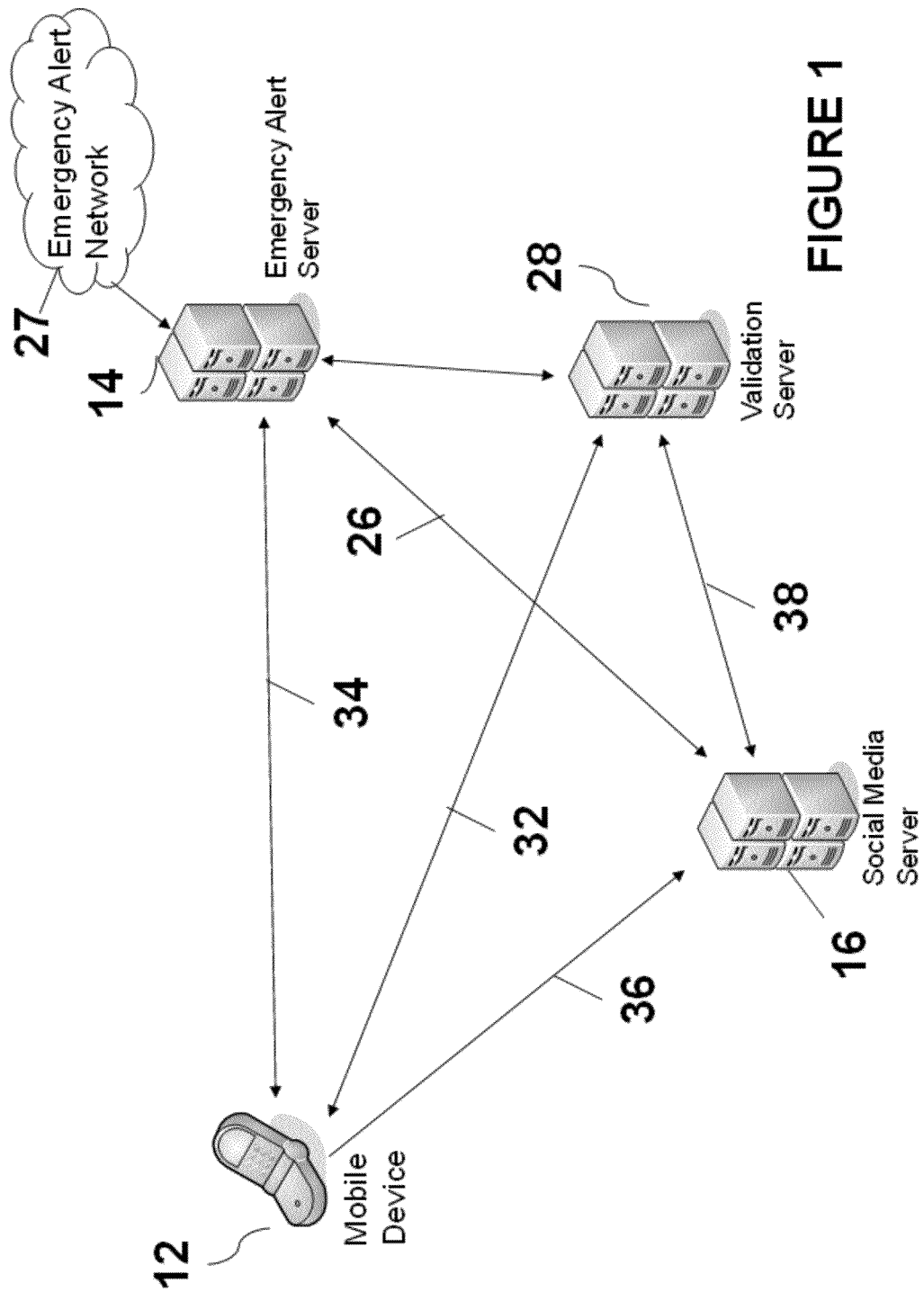
FIG. 1 illustrates an example system and process for generating and managing emergency alert messages.

FIG. 1 illustrates an example system and process for generating and managing emergency alert messages. As shown, the system of FIG. 1 may comprise all or any appropriate combination of a mobile device 12, a social media server 16, a validation server 28, an emergency alert server 14 and entity 27 of an emergency alert network.

As depicted in FIG. 1, an emergency alert server 14 may receive an indication of an emergency from an entity 27. Emergency alert server 14 may comprise any appropriate entity (e.g., a processor, a server, a computer, or the like) as described in more detail herein. The entity 27 may comprise any appropriate entity capable of providing an indication of an emergency (e.g., government agency, individual, social medium, emergency responder, network, etc.). Based on the indication of the emergency, the emergency alert server 14 may generate an emergency alert message. Upon generating the emergency alert message, emergency alert server 14 may distribute the emergency alert message. Emergency alert server 14 may distribute the emergency alert message via any appropriate medium. For example, emergency alert server 14 may provide the emergency alert message via a broadcast, video, email, SMS, social media, or the like, or any appropriate combination thereof.

In an example embodiment, the emergency alert message may incorporate an indication of trustworthiness. For example, the indication of trustworthiness could be an identifier or a token that is embedded in the message. The identifier, for example, could be associated with the user that distributed the message. For example, entity 27 such as the public safety organization could have an identifier associated with its organization. When the public safety organization posts an emergency alert message, the message will embed the identifier in the message. If a mobile device 12 posts an emergency alert message on the social media server 16, an identifier may also be associated with the mobile device 12 user. In an example embodiment, the identifier may be transparent to the mobile device user 12, a recipient of the emergency alert message.

In an example embodiment, the emergency alert server 14 may distribute the emergency alert message via the social media server 16. For example, social media server may broadcast emergency alert messages to provide mobile devices 12 with information about an emergency. An emergency responder, for example, may receive information about an emergency via multiple social media server 16 (Twitter, Facebook, etc.). In order to know where to send information, in an example embodiment, Public Safety agencies 27 may create social network sites in advance (e.g., Facebook page, Twitter site). The entity 27 such as the public safety organization may also advertise their social media locations via radio, TV, on emergency vehicles, etc. The advertisement campaign by entity 27 such as the public safety organization may enable the public to recognize bogus sites from the real Public Safety sites. The mobile user 12 such as an emergency responder, or more specifically equipment of the emergency responder, may correlate the information posted on the social media server 16 to provide an accurate description of the emergency, such as track of a storm, tornado, gas plume, etc.

In an example embodiment, the emergency alert server 14 may also generate emergency alert messages based on information obtained from a plurality of social media sources. For example, the emergency alert server 14 may be correlated emergency messages from the social media server 16. If there are a lot of messages on the social media sever 16 indicating an emergency, the emergency alert server 14 can generate an emergency alert based on the plurality of message. For example, if the emergency alert server 14 correlates emergency information from authenticated sources in social media, the emergency alert server 14 may generate an emergency alert message based on this information. In another example, if the emergency alert server 14 analyzes emergency messages posted by a plurality mobile device 12 users from the same location, this may indicate an element of trustworthiness of the message. The emergency alert server 14 may then generate an emergency alert message based on the information correlated from mobile device 12 users posting the same emergency information from a certain location.

In an example embodiment, the mobile device 12 may provide feedback about the trustworthiness of an emergency alert message. For example, the indication of trustworthiness may be based on a ranking value provided by the mobile device 12. In another embodiment, the indication of trustworthiness may be based on feedback from the mobile device 12. For example, the mobile device 12 may provide a ranking value on a website or an emergency alert message based on the mobile device 12 user's perception of the trustworthiness of the message. This may be accomplished by the mobile device 12 user's ranking, voting, or otherwise providing feedback on the trustworthiness of the emergency alert messages. In another example the recipient of the message could rank social media outlets such as individual users or organizations that post emergency-related information. If the mobile device 12 user believes that the emergency alert message or a user is not posting valid information on the social media server 16, the mobile device 12 user may provide a low ranking value. In another example, if the mobile device 12 user believes that the emergency alert message is valid or the user has provided valid information before on the social media server 16, the mobile device 12 user may provide a high ranking value.

In an example embodiment, when the mobile device 12 user provides feedback on the indication of trustworthiness, the emergency alert server 14 may update the indication of trustworthiness based on the feedback from the mobile device 12. For example, if the mobile device 12 user provides a rating value of low or if the mobile device 12 user provides feedback that the message or the user posting the message are inaccurate, then the emergency alert server 14 may update the indication of trustworthiness associated with the message to a low value or a value that indicates that the message could not be validated.

The emergency alert server 14 may also update an emergency alert message based on feedback from a mobile device 12 user. For example, if the mobile device 12 user provides feedback about an updated status of an emergency, the emergency alert server 14 may generate an updated emergency alert message. The emergency alert server 14 may then distribute the updated emergency alert message based on the feedback provided to the social media server 16.

In an example embodiment, the mobile device 12 may initiate the validation of a message posted on the social media server 16. For example, the mobile device 12 user may click on an identifier associated with the emergency alert message such as a validate button to initiate the validation of an emergency alert message posted on the social media server 16. The emergency alert message may, for example, have a unique identifier embedded in the message. In an example embodiment, when the user clicks on the validate button, a unique identifier associated with the emergency alert message may be sent to a validation server 28 or the emergency alert server 14. The validation server 28 or the emergency alert server 14 may compare the identifier associated with the embedded message with identifiers that are known to be associated with authenticated sources. For example, an entity 27 such as the public safety organization may be given an identifier 1234. Therefore when the entity 27 such as the public safety organization provides indication of an emergency alert message to be broadcast on the social media server 16, the emergency alert messages will embed the identifier 1234 in the messages. If a mobile device 12 user, who is not the public safety organization, posts a message on the social media server 16, the mobile device 12 user's message may have a different identifier, 3456, embedded in the message. When the mobile device user 12 clicks on the validate button, the validation server 28 or the emergency alert server 14 may compare the identifier embedded in the message, here 3456, with the identifier that are known to be authenticate sources, here 1234. Since the identifier 3456 does not match with an identifier that is known to be from an authenticate source, the validation server 28 or the emergency alert server 14 may be unable to validate the emergency alert message. If the identifiers match, then the validation server 28 or the emergency alert server 14 may indicate that the message is validated.

The validation server 28 or the emergency alert server 14 may perform the comparison even without any input from the mobile device 12 user to validate the message. The validation server 28 or the emergency alert server 14 may compare the identifier embedded in the token with the identifier it received from the emergency responder. If the identifiers match, the validation server 28 or the emergency alert server 14 may send an indication to the mobile device 12 indicating that the information posted on the social media server 16 is valid. If the identifiers do not match, the validation server 28 or the emergency alert server 14 may send an indication to the mobile device 12 that the information posted on the social media server 16 could not be validated.

In another example embodiment, the validation server 28 or the emergency alert server 14 may validate the trustworthiness of the emergency alert message by based on information obtained from a variety of sources. For example, the indication of trustworthiness may be based on information correlated from information in the social media server 16. In another example, the indication of trustworthiness may also be based on information correlated from sources other than social media server 16 such as authenticated websites from public safety. Therefore, for example, if an emergency alert message is posted on the social media server 16, the validation server 28 or the emergency alert server 14 may validate the trustworthiness of the message by correlating information from other sources. For example, if there are many people on social media reporting the same emergency or if authenticated websites such as public safety also report the same information, the validation server 28 or the emergency alert server 14 may utilize the correlated information to validate the emergency alert message broadcast on the social media server 16.

In an example embodiment, trustworthiness of the emergency alert message may be indicative of the source of the message. For example, if the source of the emergency alert message is from an entity 27 such as an public safety organization, then the validation server 28 or the emergency alert server 14 may validate the trustworthiness of the message because the source of the emergency alert message is an authenticate source. In another example embodiment, the indication of the trustworthiness from validation server 28 or the emergency alert server 14 may be indicative of the data contained in the emergency alert message. For example, if the emergency alert message is posted by a mobile device 12 user who may not be authenticated, then the validation server 28 or the emergency alert server 14 may validate that the information contained in the emergency alert message is valid. If a mobile device 12 user, who is present at the scene of the emergency, posts an emergency alert message on social media, for example, then the validation server 28 or the emergency alert server 14 may verify that the emergency is valid even though the user is not an authenticated entity 27 such as the public safety organization.

FIG. 2, FIG. 3, FIG. 4, FIG. 5, FIG. 6, FIG. 7, and FIG. 8 depict various example embodiments of processes for implementing emergency alert messages via social media. The processes are described with reference to the system depicted in FIG. 1. It is to be understood however, that the implementation of the various example embodiments of processes is not limited thereto. Systems other than the system depicted in FIG. 1 may be utilized to implement the various embodiments of processes depicted in FIG. 2, FIG. 3, FIG. 4, FIG. 5, FIG. 6, FIG. 7, and FIG. 8.

Figure 2:
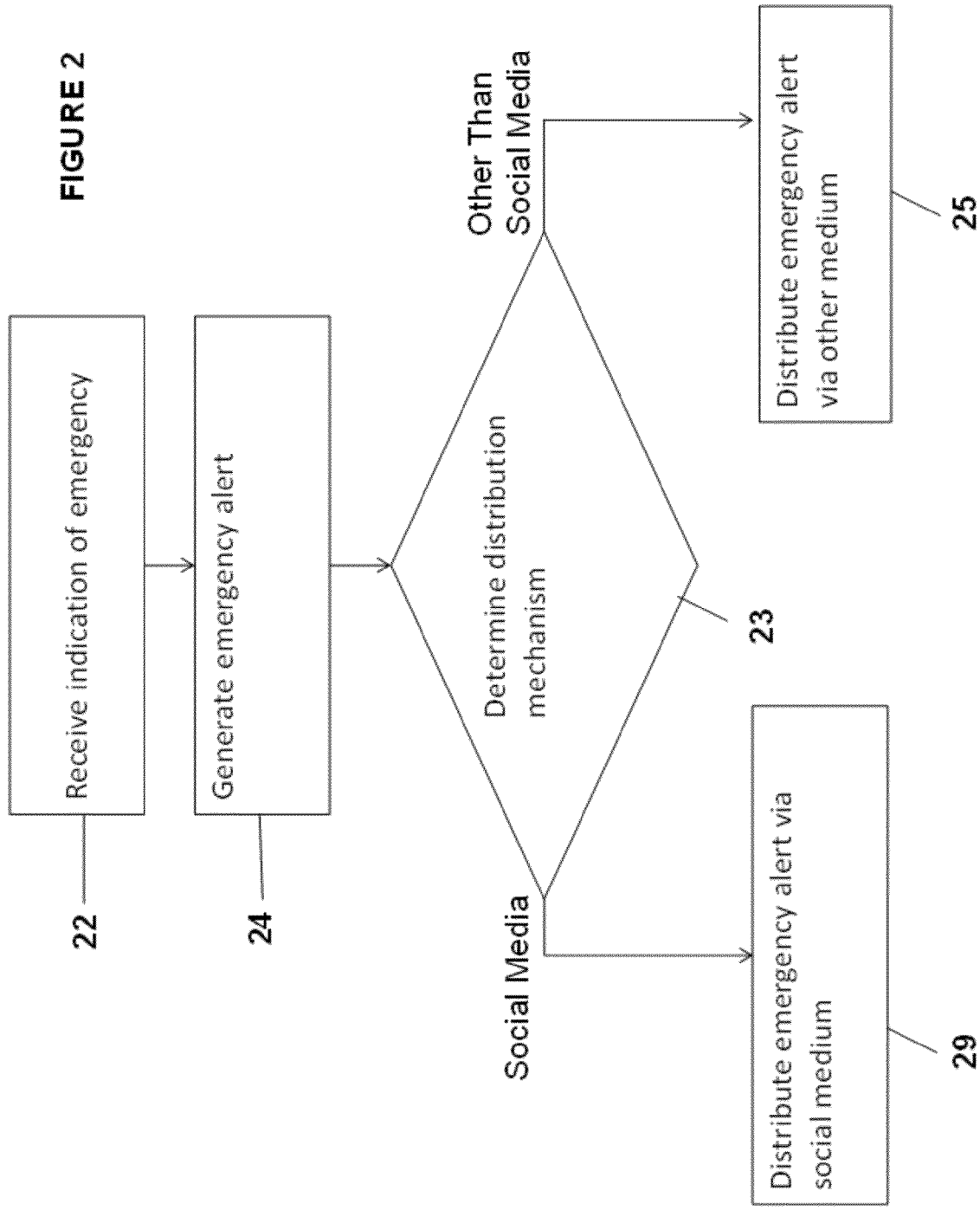
FIG. 2 illustrates an example embodiment of distributing an emergency alert message.

FIG. 2 illustrates a flow diagram of an example process for distributing an emergency alert message. In an example embodiment, the emergency alert server 14 may receive an indication of emergency at step 22 from an entity 27. Based on that indication, the emergency alert server 14 may generate an emergency alert message at step 24. Emergency alert server 14 may then determine how to distribute the emergency alert message via any appropriate medium 23. For example, emergency alert server 14 may distribute the emergency alert message at step 29 via a social media server 16. The emergency alert server 14 may also distribute the emergency alert message via other medium at step 25 such as broadcast, video, email, SMS, social media, or the like, or any appropriate combination thereof.

Figure 3:
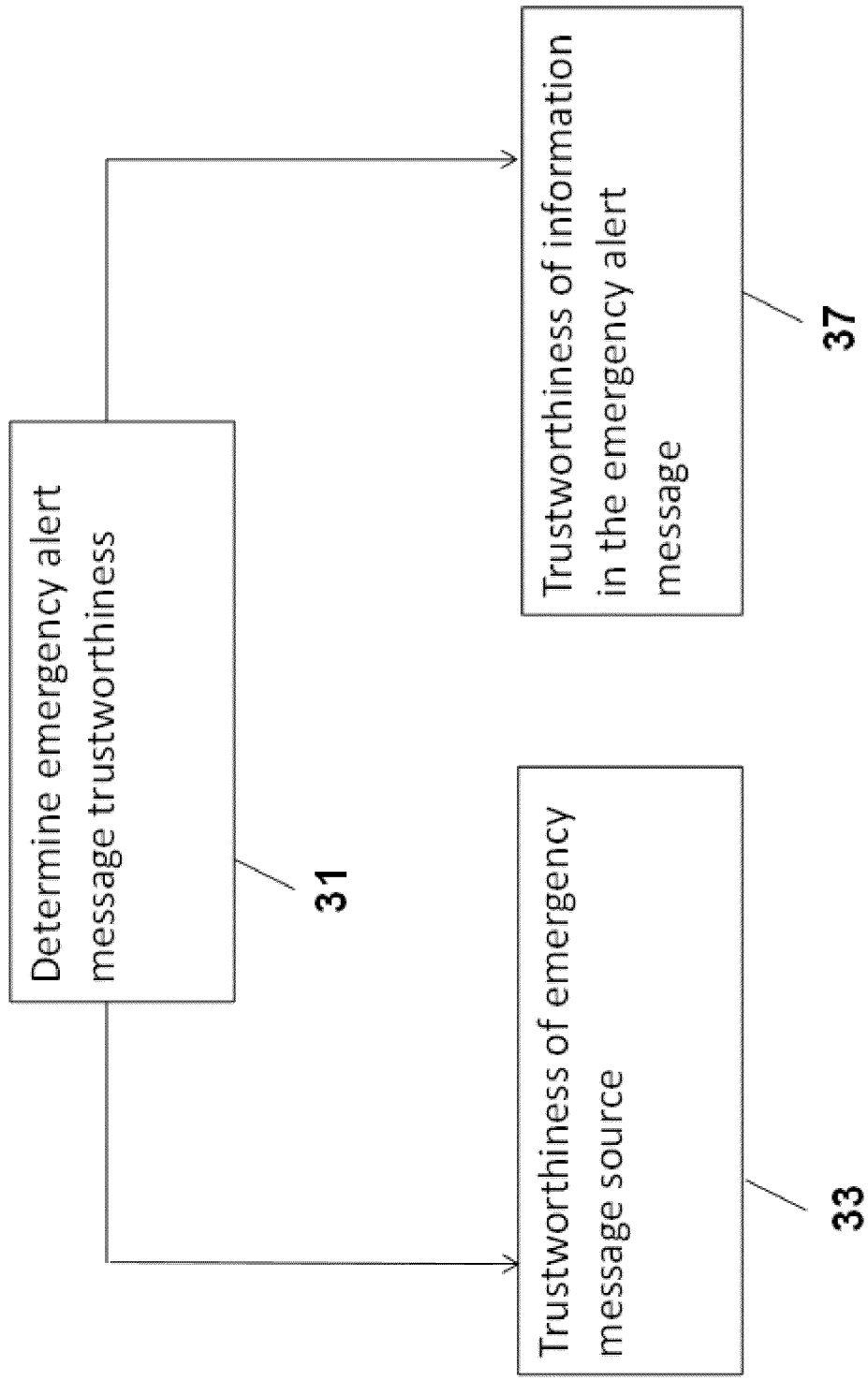
FIG. 3 illustrates an example embodiment of trustworthiness of the emergency alert message that may be validated.

FIG. 3 illustrates an example embodiment of trustworthiness of the emergency alert message that may be validated. In an example embodiment, the emergency alert server 14 or a validation server 28 may determine that emergency alert message needs to be validated for its trustworthiness at step 31. An indication of trustworthiness of an emergency alert message may be indicative of the source of the message at step 33. For example, if the source of the emergency alert message is from an entity 27 such as the public safety organization, then the emergency alert server 14 may indicate that the message is valid because the source of the emergency alert message is an authenticate source. In another example, if the source of the emergency alert message is from a standard mobile user 12 such as a reputable news organization, then the emergency alert server 14 may indicate that the message is valid because the source of the emergency alert message is a valid source. As FIG. 3 further illustrates, in another example embodiment, the indication of the trustworthiness may be indicative of the information contained in the emergency alert message at step 37. For example, if the emergency alert message is posted by a mobile device 12 user that may not be authenticated, then the emergency alert server 14 emergency alert server 14 may validate that the information contained in the emergency alert message is valid. If a mobile device 12 user, who is present at the scene of the emergency, posts an emergency alert message on the social media server 16, for example, then the emergency alert server 14 emergency alert server 14 may verify that the emergency is valid even though the mobile device 12 user is not an authenticated source.

Figure 4:
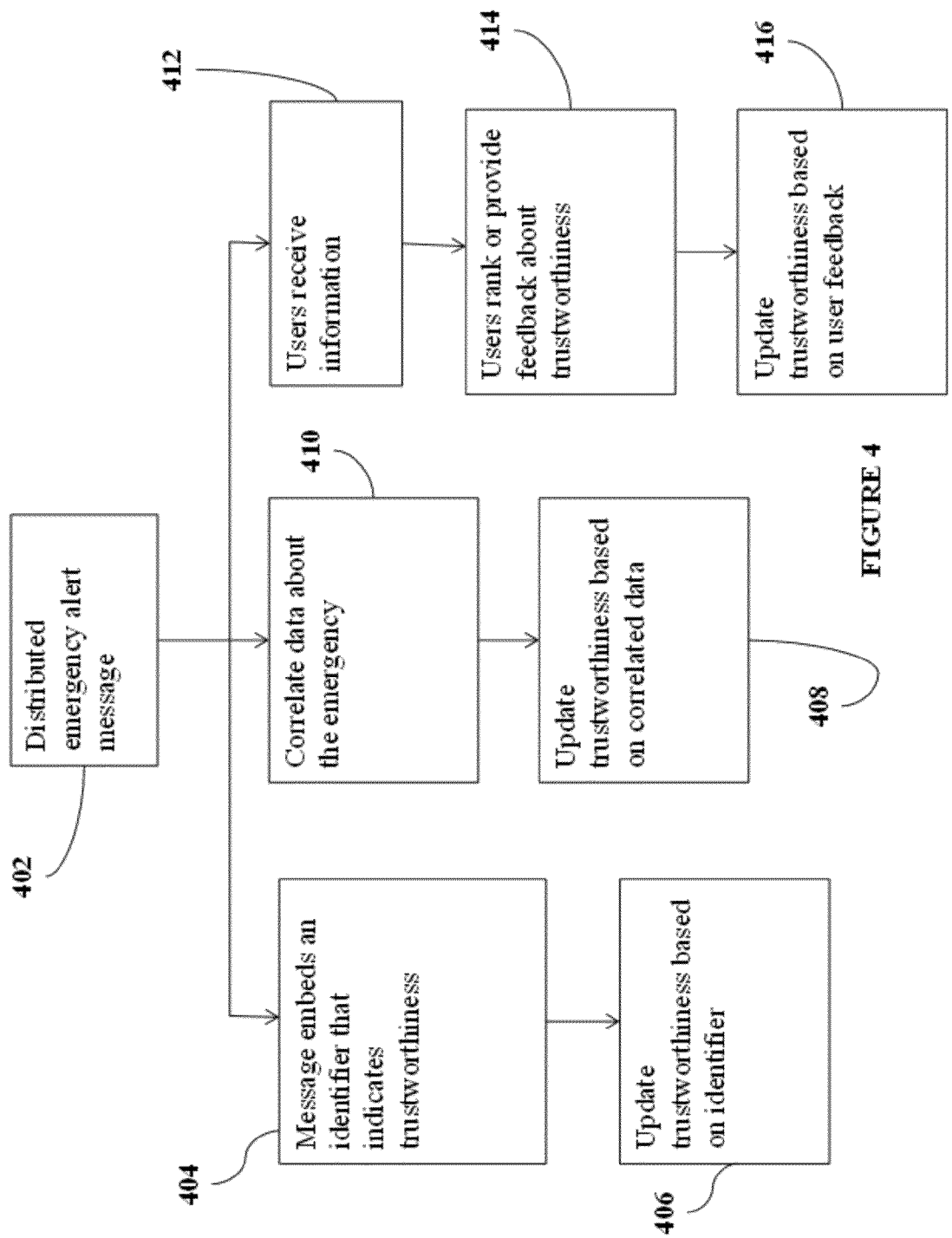
FIG. 4 illustrates a plurality of sources from which the indication of trustworthiness may be based.

As illustrated in FIG. 4, the indication of trustworthiness may be based on information obtained from a variety of sources. In an example embodiment, an emergency alert server 14 distributes an emergency alert message to the social media server 16. The emergency alert server 14 may correlate data about the emergency from a plurality of sources at step 410. For example, the emergency alert server may correlate data about the emergency from the social media server 16 or from other mediums such as websites, TV broadcast etc. Based on the information correlated from the plurality of sources at step 410, the emergency alert server 14 may update the trustworthiness of the emergency alert message based on the correlated data 408. Therefore, for example, if there are many people on social media reporting the same emergency or if authenticated websites such as a public safety organization also report the same information, then the emergency alert server 14 emergency alert server 14 may utilize the correlated information to validate and update the trustworthiness of the emergency alert message.

As further illustrated in FIG. 4, the indication of trustworthiness may be based on an identifier that is embedded in the emergency alert message at step 404. For example, a token may be embedded in the emergency alert message. In another example, messages distributed by an emergency response may have an embedded validation code, token, or the like. The token may be associated with the mobile device 12 user posting the emergency alert message or the entity 27 which generated the emergency alert message. If the identifier is an authenticated identifier, then the emergency alert server 14 may update the trustworthiness of the message based on the identifier embedded in the emergency alert message at step 406.

As further illustrated in FIG. 4, the indication of trustworthiness may be based on a ranking value. In another embodiment, the indication of trustworthiness may be based on feedback from the recipient of the message such as a mobile device 12 user. For example, when the message is distributed to the social media server at step 402, the mobile device 12 users receive the information at step 412. The mobile device 12 users may provide feedback such as a ranking value based on their perception of the trustworthiness of the message. The feedback may comprise mobile device 12 users ranking, voting, or otherwise providing feedback on the trustworthiness of the emergency alert messages at step 414. In another example the recipient of the message may rank social media outlets such as individual users or organizations that post emergency-related information. If the recipient believes that the emergency alert message or a user is not posting valid information, the recipient may provide a low ranking value. In another example, if the recipient believes that the emergency alert message is valid or the user has provided valid information before, the recipient may provide a high ranking value. Based on the feedback from the recipient of the message, the emergency alert server 14 may update the indication of trustworthiness of the message at step 416. For example, if the recipient of the message provides a rating value of low or if the recipient of the message provides feedback that the message or the user posting the message are inaccurate, then the emergency alert server 14 emergency alert server 14 may update the indication of trustworthiness associated with the message to a low value or a value that indicates that the message could not be validated.

Figure 5:
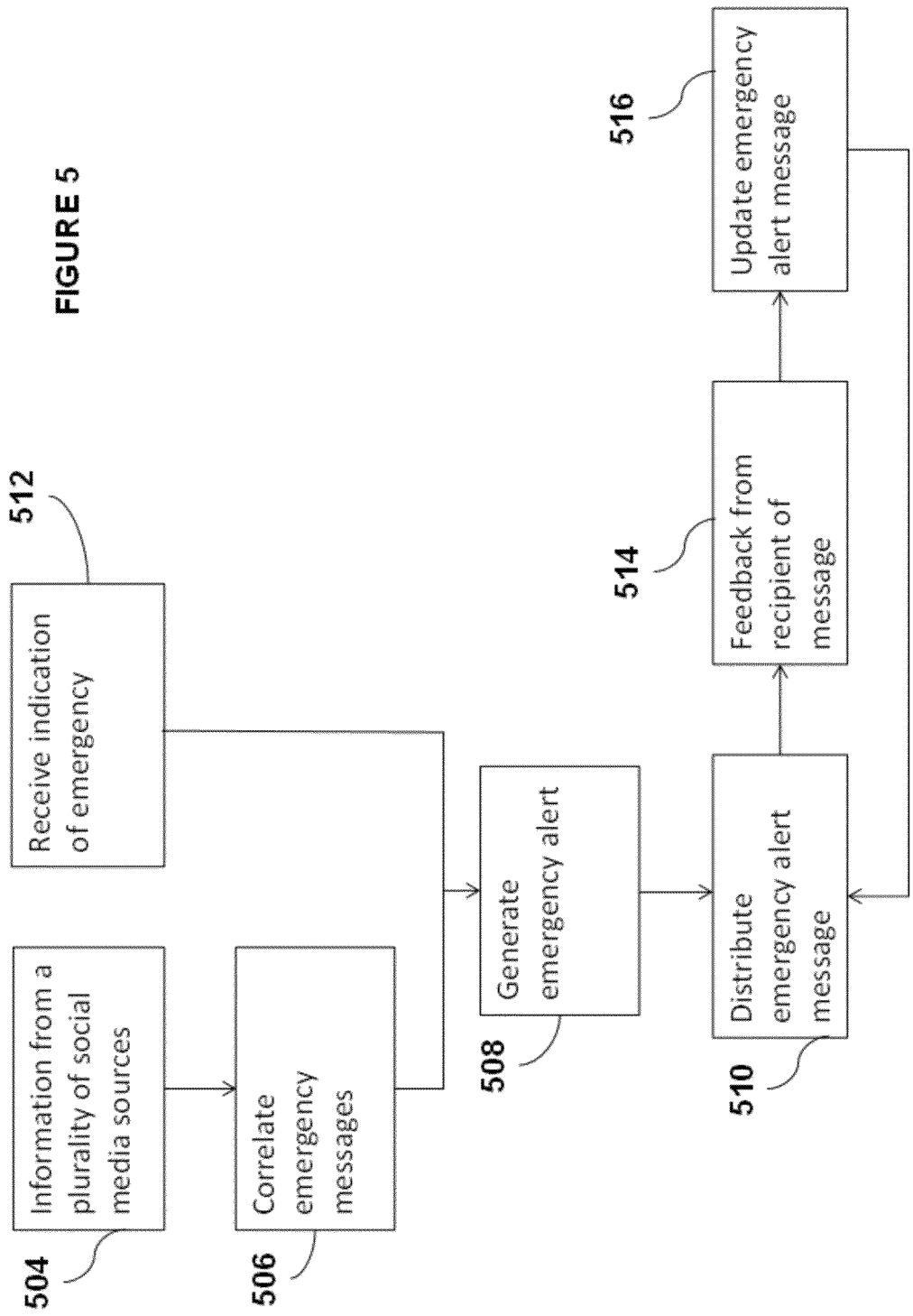
FIG. 5 illustrates a plurality of sources from which the emergency alert messages may be generated.

As illustrated in FIG. 5, the emergency alert server 14 may generate message based on information obtained from a plurality of social media sources. In an example embodiment, the emergency alert server 14 emergency alert server 14 may obtain information at step 504 from a plurality of social media server 16. The emergency alert server 14 may correlate the emergency messages from the social media at step 506. If there are a lot of messages from the social media sources indicating an emergency, the emergency alert server 14 emergency alert server 14 may generate an emergency alert based on the indication of an emergency from the correlated information. For example, if the emergency alert server 14 emergency alert server 14 correlates information from authenticated sources such as public safety users on social media, then the emergency alert server 14 emergency alert server 14 may generate an emergency alert message based on this information. In another example, if the emergency alert server 14 emergency alert server 14 analyzes that the emergency messages posted by users are located in one locality; this may indicate an element of trustworthiness of the message. The emergency alert server 14 emergency alert server 15 may then generate an emergency alert message 508 based on the information correlated.

In another embodiment, a plurality of sources such as social media may be utilized to provide emergency responders with information about an emergency. This information may be correlated to update information that is distributed as an emergency alert. For example, an emergency responder may receive information about an emergency via multiple social media modes (Twitter, Facebook, etc.). In order to know where to send information, in an example embodiment, Public Safety agencies may create social network sites in advance (e.g., Facebook page, Twitter site). The Public Safety agencies may also advertise their social media locations via radio, TV, on emergency vehicles, etc. The advertisement campaign by Public Safety agencies would enable the general public to recognize bogus sites from the real Public Safety sites. The emergency responder, or more specifically equipment of the emergency responder, may correlate the information to provide an accurate description of the emergency, such as track of a storm, tornado, gas plume, etc.

As further illustrated in FIG. 5, the emergency alert server 14 may generate a message based on an indication of emergency at step 512. This indication may be provided from an entity 27. The indication may also be provided by authorized organizations such as public safety organizations. Based on an indication of an emergency, the emergency alert server 14 emergency alert server 14 will generate an emergency alert message at step 508. The emergency alert server 14 emergency alert server 14 will then distribute the emergency alert message.

As further illustrated in FIG. 5, the emergency alert server 14 may update a message at step 516 based on feedback from recipient of the message such as a mobile device 12 user. For example, if the recipient of the message provides feedback at step 514 about an updated status of an emergency, the emergency alert server 14 may generate an updated emergency alert message at step 516. The emergency alert server 14 may then distribute the updated emergency alert message based on the feedback provided at step 510.

Figure 6:
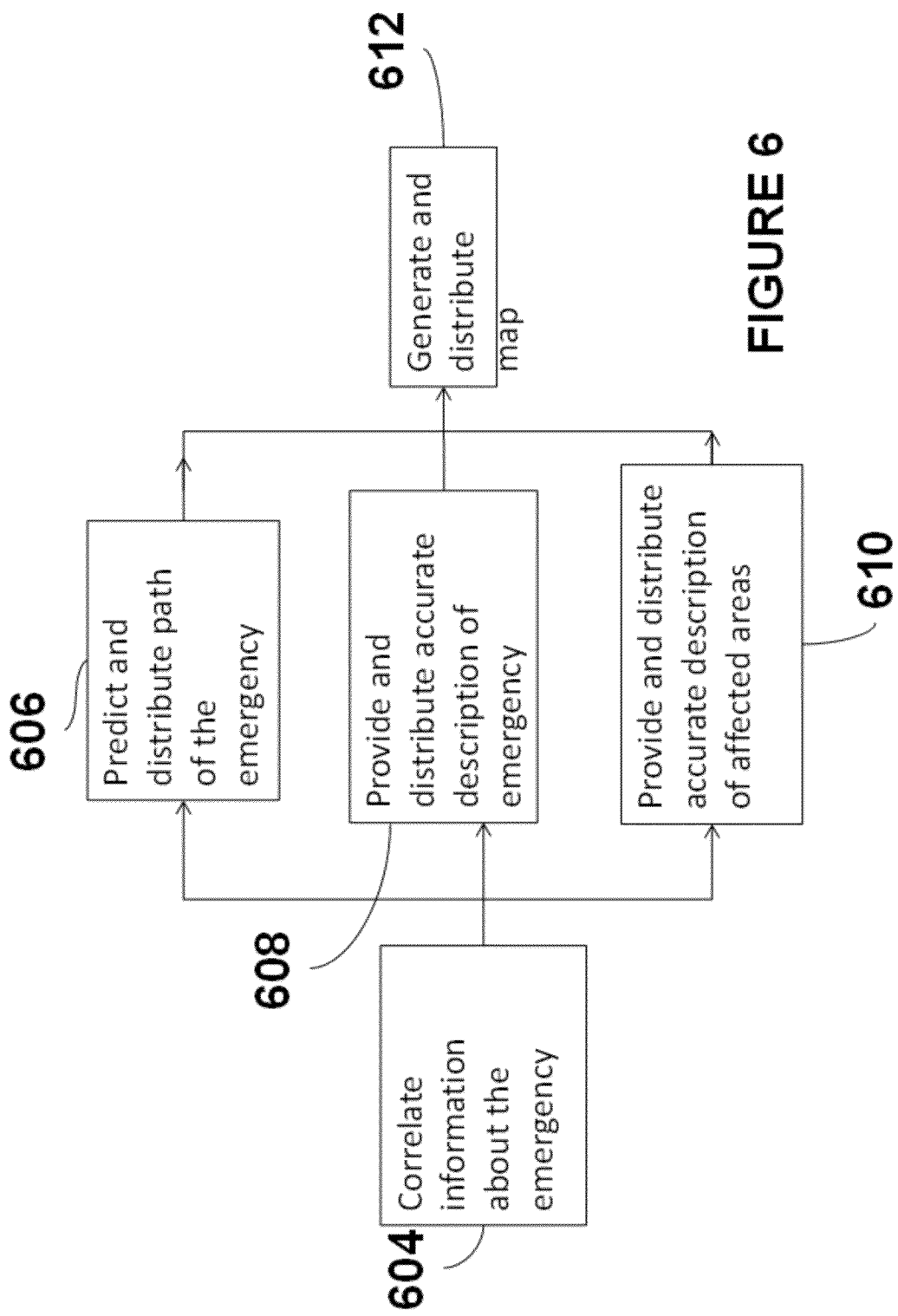
FIG. 6 illustrates that information distributed on social media may be correlated to provide a description of the emergency.

As illustrated in FIG. 6, information distributed on social media server 16 may be correlated to provide an accurate description of the emergency. For example, if many people in a location post messages about the state of the emergency, the information about the emergency may be correlated at step 604 and an updated message may be broadcast that indicates an accurate description of the emergency 608. The correlated data may help provide a description of the affected areas as well at step 610. For example, if messages on social media indicate an updated description of the affected areas, the emergency alert server 14 may generate messages indicating an accurate description of the affected areas and post these messages on social media at step 610. The correlated information also may be used to predict the state of an emergency at step 606. For example, based on information posted on a storm, the emergency alert server 14 may be able to predict the path of the storm at step 606. The emergency alert server 14 may be able to provide an updated visual image of the description and predictions based on the correlated information at step 612. The information collected from social media may be correlated to generate and provide predicted information, such as expected track of a storm, tornado, gas plume, etc. The emergency alert server 14 may, for example, generate a map at step 612 of an emergency area, tracks, effected entities (schools, hospital, food stores, etc.) and distribute at step 612 this information as part of the emergency alert message. The information could be distributed via various medium such as social media server 16, websites etc.

Figure 7:
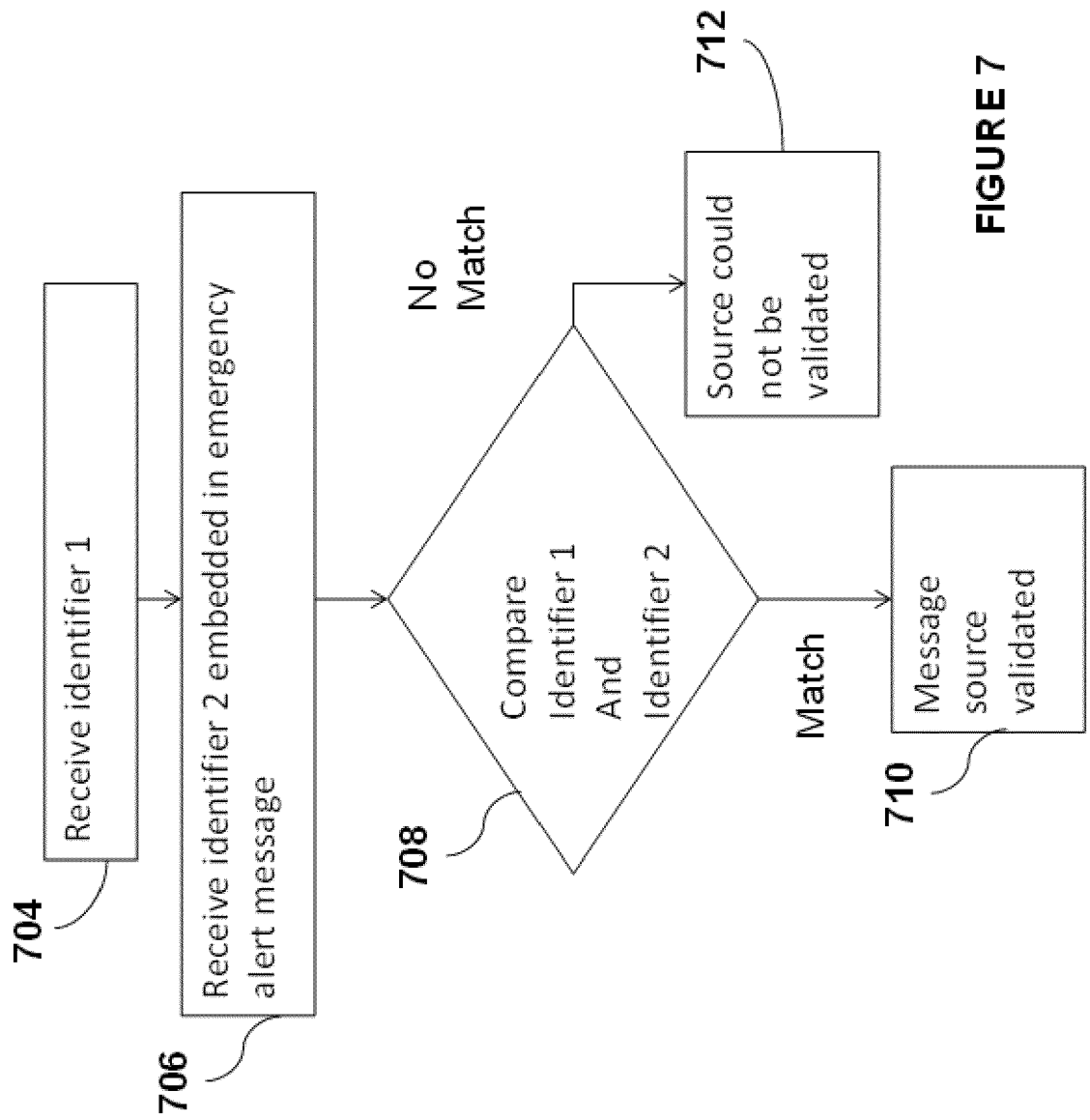
FIG. 7 illustrates that emergency alert message may be verified for trustworthiness by validating the indication of trustworthiness embedded in the message.

As illustrated in FIG. 7, in an example embodiment, the emergency alert message may be verified for trustworthiness by validating the indication of trustworthiness embedded in the message. This validation can take place either by a third party server 28 or the emergency alert server 14. In an example embodiment, messages distributed by an emergency response may have an embedded validation code, token, or the like. In an example embodiment, the token may be transparent to the recipient of the message. The identifier may be associated with the user posting the emergency alert message or the user which generated the emergency alert message such as a mobile device 12 user or an entity 27. The validation server 28 or the emergency alert server 14 may receive an identifier, identifier 1, associated with authenticate sources at step 704.

As further illustrated in FIG. 7, the validation server 28 or the emergency alert server 14 may receive at step 706 another identifier, identifier 2, embedded in the emergency alert message that the validation server 28 or the emergency alert server 14 will need to validate. For example, if user of the social media posts an emergency alert message, a unique identifier associated with the user will be embedded in the message. When a recipient receives the emergency alert information, the recipient may validate the information by selecting a validate button, or the like. Clicking the button may send the embedded validation identifier to the third party. The emergency alert server 14 may compare at step 708 the identifier associated with the embedded message with identifiers that are known to be associated with authenticated sources. For example, a public safety organization may be given an identifier 1234. Therefore when the public safety organization posts emergency alert messages on the social media, the messages will embed the identifier 1234 in the messages. If a user, who is not the public safety organization, posts a message, the user's message may have a different identifier, 3456, embedded in the message. When the user clicks on the validate button, the emergency alert server 14 may compare the identifier embedded in the message, here 3456, with the identifier that are known to be authenticate sources, here 1234. Since the identifier 3456 does not match with an identifier that is known to be from an authenticate source, the emergency alert server 14 will be unable to validate the emergency alert message at step 710. If the identifiers match, then the emergency alert server 14 will indicate that the message is validated at step 712. The emergency alert server 14 may do the comparison even without any input from the user to validate the message. The validation server 28 or the emergency alert server 14 may compare 708 the received validation identifier, identifier 2, with the validation identifier, identifier 1, it received from the emergency responder. If the identifiers match, the validation server 28 or the emergency alert server 14 may send an indication to the recipient indicating that the information is valid 710. If the identifier does not match, the validation server 28 or the emergency alert server 14 may send an indication at step 712 to the recipient that the information could not be validated.

Figure 8:
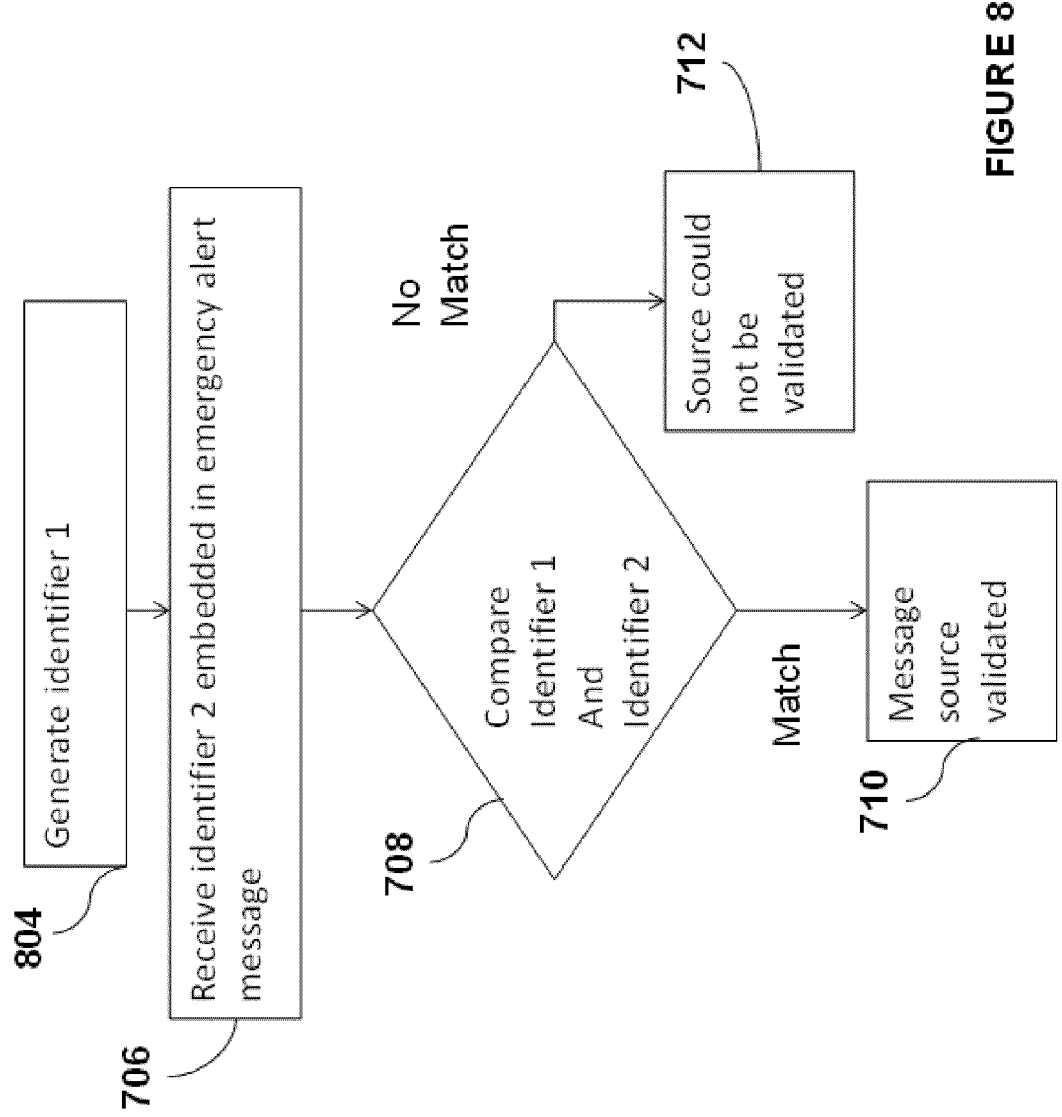
FIG. 8 illustrates that the identifier associated with emergency alert messages may also be generated in a system.

As illustrated in FIG. 8, the identifier associated with users also may be generated in a system. For example, if a user signs up to a service, the service may automatically generate identifiers associated with the user at step 804. The user may then have that identifier associated with it when the user posts messages via the service. The service may include subscribing to the emergency alert server 14 or the social media server 16 or the like. The service may determine authenticated users when they sign up. For example, when a public safety organization signs up, the service may determine that the organization is an authenticate source. Therefore, when the public safety organization posts message, the emergency alert server 14 will automatically compare at step 708 the identifier embedded in the message with a known authenticate identifier and validate the message is there is a match at step 710.

Figure 9:
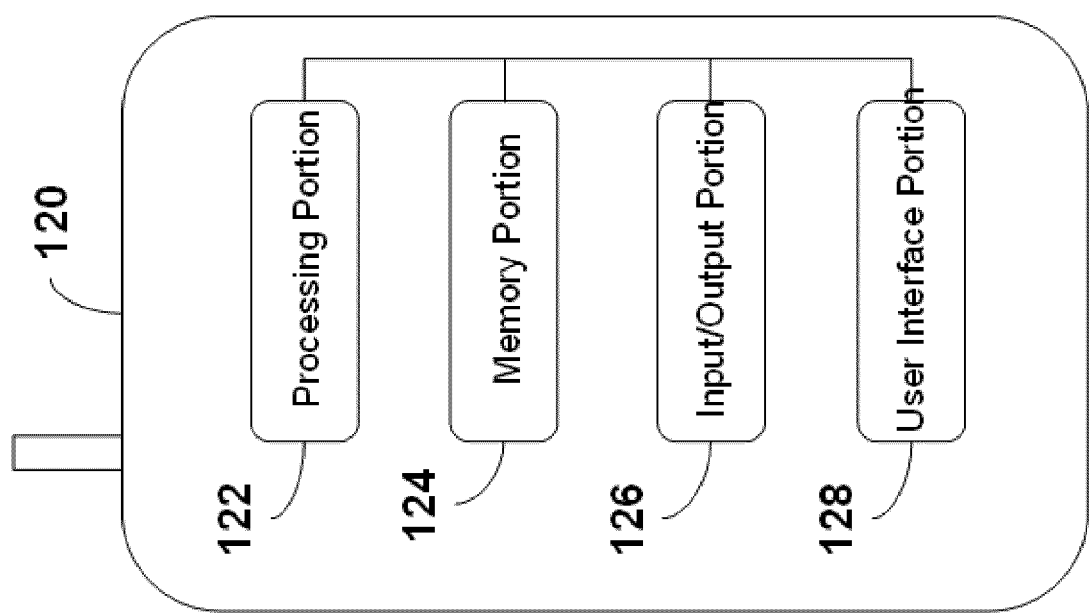
FIG. 9 illustrates block diagram of an example communications device configured to facilitate distribution and validation of messages on social media.

FIG. 9 is a block diagram of an example communications device 120 configured to facilitate distribution and validation of messages on social media. In an example embodiment, the communications device 120 may comprise the mobile device 12. In an example configuration, communications device 120 comprises a mobile wireless device. The communications device 120, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The communications device 120 can include devices that are not typically thought of as portable, such as, for example, a public computing device, a navigation device installed in-vehicle, a set top box, or the like. The mobile communications device 120 can include non-conventional computing devices, such as, for example, a kitchen appliance, a motor vehicle control (e.g., steering wheel), etc., or the like. As evident from the herein description a communications device, a mobile device, or any portion thereof is not to be construed as software per se.

The communications device 120 may include any appropriate device, mechanism, software, and/or hardware for facilitating distribution and validation of emergency alert message services as described herein. A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like.

Mobile devices may further be configured to include a client application that enables the end-user to log into an end-user account that may be managed by another computing device. Such end-user account, for example, may be configured to enable the end-user to receive emails, send/receive IM messages, SMS messages, access selected web pages, participate in a social networking activity, or the like. However, participation in various social networking activities may also be performed without logging into the end-user account.

In addition, mobile devices may include another application that is configured to enable the mobile user to display and interact with various integrated live views that are configured based, in part, on the mobile user's social networking activities, experiences, and the like, including vitality information associated with the mobile user's social network. The integrated live views may be directed towards providing the mobile user with a virtual 'hang-out' space for participating in various social events, including but not limited to sending/receiving photos between social networking members, 'chitchatting' with members, blogging, sharing visual mood representations, sharing various messages, and generally participating in a variety of integrated social experiences beyond merely voice communications or text messages (e.g., IM). Moreover, such integrated live views enable the mobile user to configure highly personalized views and identities in virtual spaces within their social network.

Mobile devices may also communicate with non-mobile client devices, such as client device, or the like. In one embodiment, such communications may include participation in social networking activities, including sharing of photographs, participating in determining how to spend time with other members, sending/receiving of messages, providing information based on physical proximity between members, or similar virtual hang-out activities.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SA1, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory includes a RAM, a ROM, and other storage means. Mass memory 230 illustrates another example of computer storage media for storage of information such as computer readable instructions, data structures, program modules or other data. Mass memory stores a basic input/output system ("BIOS") for controlling low-level operation of mobile device. The mass memory also stores an operating system 241 for controlling the operation of mobile device. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory further includes one or more data storage, which can be utilized by mobile device to store, among other things, applications and/or other data. For example, data storage may also be employed to store information that describes various capabilities of mobile device. The information may then be provided to another device based on any of a variety of events, including being sent as part of a header during a communication, sent upon request, or the like. Moreover, data storage may also be employed to store social networking information including vitality information, or the like. At least a portion of the social networking information may also be stored on a disk drive or other storage medium (not shown) within mobile device.

Applications may include computer executable instructions which, when executed by mobile device, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications may further include live view manager (LVM).

In an example embodiment, the communications device 120 comprises a processor and memory coupled to the processor. The memory may comprise executable instructions that when executed by the processor cause the processor to effectuate operations associated with facilitating distribution of emergency alert messages via social media.

In an example configuration, the communications device 120 comprises a processing portion 122, a memory portion 124, an input/output portion 126, and a user interface (UI) portion 128. Each portion of the communications device 120 comprises circuitry for performing functions associated with each respective portion. Thus, each portion can comprise hardware, or a combination of hardware and software. Accordingly, each portion of the communications device 120 is not to be construed as software per se. It is emphasized that the block diagram depiction of communications device 120 is exemplary and not intended to imply a specific implementation and/or configuration. For example, in an example configuration, the communications device 120 may comprise a cellular phone and the processing portion 122 and/or the memory portion 124 may be implemented, in part or in total, on a subscriber identity module (SIM) of the mobile communications device 120. In another example configuration, the communications device 120 may comprise a laptop computer. The laptop computer can include a SIM, and various portions of the processing portion 122 and/or the memory portion 124 can be implemented on the SIM, on the laptop other than the SIM, or any combination thereof.

The processing portion 122, memory portion 124, and input/output portion 126 are coupled together to allow communications there between. In various embodiments, the input/output portion 126 comprises a receiver of the communications device 120, a transmitter of the communications device 120, or a combination thereof. The input/output portion 126 is capable of receiving and/or providing information pertaining to distribution and validation of emergency alert message services as described herein. In various configurations, the input/output portion 126 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 122 may be capable of performing functions pertaining to distribution and validation of emergency alert message services as described herein. In a basic configuration, the communications device 120 may include at least one memory portion 124. The memory portion 124 may comprise a storage medium having a tangible physical structure. Thus, the memory portion 124, as well as any computer-readable storage medium described herein, is not to be construed as a transient signal per se. Further, the memory portion 124, as well as any computer-readable storage medium described herein, is not to be construed as a propagating signal per se. The memory portion 124 may store any information utilized in conjunction with distribution and validation of emergency alert message services as described herein. Depending upon the exact configuration and type of processor, the memory portion 124 may be volatile (such as some types of RAM), non-volatile (such as ROM, flash memory, etc.), or a combination thereof. The mobile communications device 120 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 120.

The communications device 120 also may contain a user interface (UI) portion 128 allowing a user to communicate with the communications device 120. The UI portion 128 may be capable of rendering any information utilized in conjunction with distribution and validation of emergency alert message services as described herein. The UI portion 128 may provide the ability to control the communications device 120, via, for example, buttons, soft keys, voice actuated controls, a touch screen, movement of the mobile communications device 120, visual cues (e.g., moving a hand in front of a camera on the mobile communications device 120), or the like. The UI portion 128 may provide visual information (e.g., via a display), audio information (e.g., via speaker), mechanically (e.g., via a vibrating mechanism), or a combination thereof. In various configurations, the UI portion 128 may comprise a display, a touch screen, a keyboard, an accelerometer, a motion detector, a speaker, a microphone, a camera, a tilt sensor, or any combination thereof. The UI portion 128 may comprise means for inputting biometric information, such as, for example, fingerprint information, retinal information, voice information, and/or facial characteristic information.

The UI portion 128 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with distribution and validation of emergency alert message services as described herein.

Figure 10:
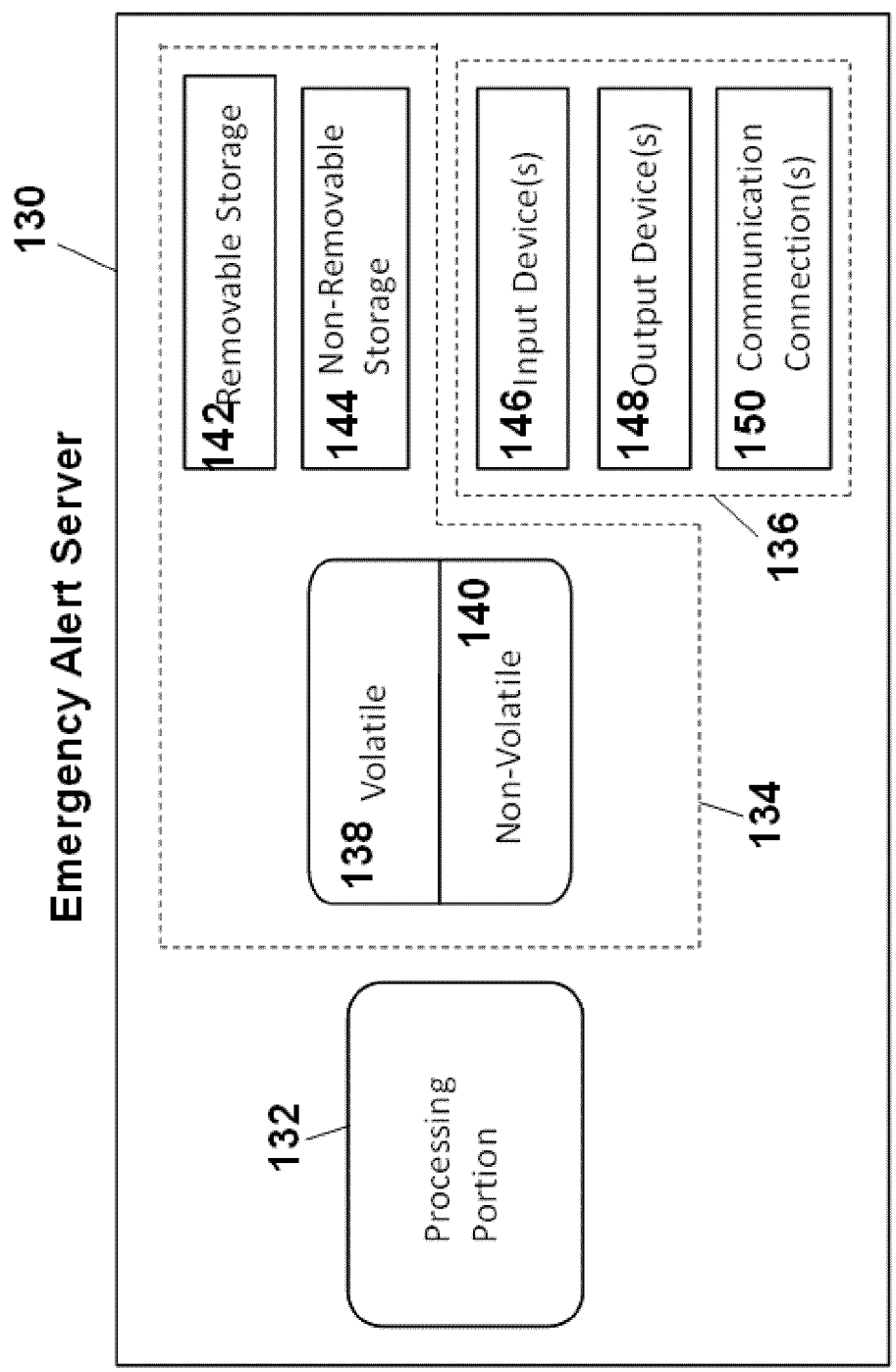
FIG. 10 illustrates diagram of an example emergency alert server system for facilitating distribution of emergency alert messages via social media.

FIG. 10 is a diagram of an example emergency alert server system 130 for facilitating distribution of emergency alert messages via social media. The system 130 may comprise hardware or a combination of hardware and software. The functionality needed to facilitate distribution and validation of emergency alert message services may reside in any one or combination of systems 130. The system 130 depicted in FIG. 3 may represent any appropriate system, or combination of apparatuses, such as a processor, a server, a gateway, a node, any appropriate entity, or any appropriate combination thereof. In an example embodiment, the system 130 may comprise the GPS combine and distribute system 12, the GPS combine and distribute system 50, or any appropriate combination thereof. It is emphasized that the block diagram depicted in FIG. 3 is exemplary and not intended to imply a specific implementation or configuration. Thus, the system 130 may be implemented in a single processor or multiple processors (e.g., single server or multiple servers, single gateway or multiple gateways, single system or multiple systems, etc.). Multiple systems may be distributed or centrally located. Multiple systems may communicate wirelessly, via hard wire, or a combination thereof.

In an example embodiment, the system 130 comprises a processor and memory coupled to the processor. The memory may comprise executable instructions that when executed by the processor cause the processor to effectuate operations associated with distribution and validation of emergency alert message services. As evident from the herein description, a system or any portion thereof is not to be construed as software per se.

In an example embodiment, the system 130 comprises a processor and memory coupled to the processor. The memory may comprise executable instructions that when executed by the processor cause the processor to effectuate operations associated with distribution and validation of emergency alert message services.

In an example configuration, the system 130 comprises a processing portion 132, a memory portion 134, and an input/output portion 136. The processing portion 132, memory portion 134, and input/output portion 136 are coupled together (coupling not shown in FIG. 9) to allow communications there between. The input/output portion 136 may be capable of receiving and/or providing information from/to a communications device and/or other network entities configured to be utilized with distribution and validation of emergency alert message services via social media. For example, the input/output portion 136 may include a wireless communications (e.g., 2.5G/3G/4G/GPS) card. The input/output portion 136 may be capable of receiving and/or sending video information, audio information, control information, image information, data, or any combination thereof. In an example embodiment, the input/output portion 36 may be capable of receiving and/or sending information to determine a location of the system 130 and/or the communications device 30. In an example configuration, the input\output portion 136 may comprise and/or be coupled to a GPS receiver. In an example configuration, the system 130 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 136 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 132 may be capable of performing functions associated with distribution and validation of emergency alert message services as described herein. That is, a communications device (e.g., communications device 120) may perform functions internally (by the device) and/or utilize the system 130 to perform functions. For example, the processing portion 132 may be capable of, in conjunction with any other portion of the system 130, installing an application for distribution and validation of emergency alert message services, processing an application for distribution and validation of emergency alert message services, configuring the system 130 to function as a gateway for other devices to a network, determining the location at which to provide distribution and validation of emergency alert message services, or the like, or any combination thereof. The processing portion 132, in conjunction with any other portion of the system 130, enables the system 130 to covert speech to text when it is configured to enhance location based services.

In a basic configuration, the system 130 may include at least one memory portion 134. The memory portion 134 may comprise a storage medium having a tangible physical structure. Thus, the memory portion 134, as well as any computer-readable storage medium described herein, is not to be construed as a transient signal per se. The memory portion 134, as well as any computer-readable storage medium described herein, is not to be construed as a propagating signal per se. The memory portion 134 may store any information utilized in conjunction with distribution and validation of emergency alert message services as described herein. Depending upon the exact configuration and type of processor, the memory portion 134 may be volatile 138 (such as some types of RAM), non-volatile 140 (such as ROM, flash memory, etc.), or a combination thereof. The system 130 may include additional storage (e.g., removable storage 142 and/or non-removable storage 144) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the system 130. One or more applications are loaded into mass memory and run on operating system. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Vitality Data Manager (VDM) may also be included as an application program within applications 350. VDM is configured to receive from a variety of sources information that may be associated with social networking activities of various social networking members. Such information may include but is not limited to various communications, including emails, SMS messages, IM messages, audio messages, VOIP messages, RSS feeds, membership information, calendar events, photo streams, photographs, blog updates, web pages, mood information, behaviors of social network members, or the like. VDM may aggregate or otherwise combine at least some of the received information to generate aggregate vitality information such as a mood of a group, organization, or the like, group events, albums, aggregate music selections, tags, or the like. VDM may also distribute at least some of the received and/or aggregated information to one or more social networking members, such as mobile devices and/or client device of FIG. 1 or the like. VDM may employ a process substantially similar to that described below in conjunction with FIG. 4.

The system 130 also may contain communications connection(s) 150 that allow the system 130 to communicate with other devices, systems, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The system 130 also can include input device(s) 146 such as keyboard, mouse, pen, voice input device, touch input device, etc. Output device(s) 148 such as a display, speakers, printer, etc. also can be included.

Figure 11:
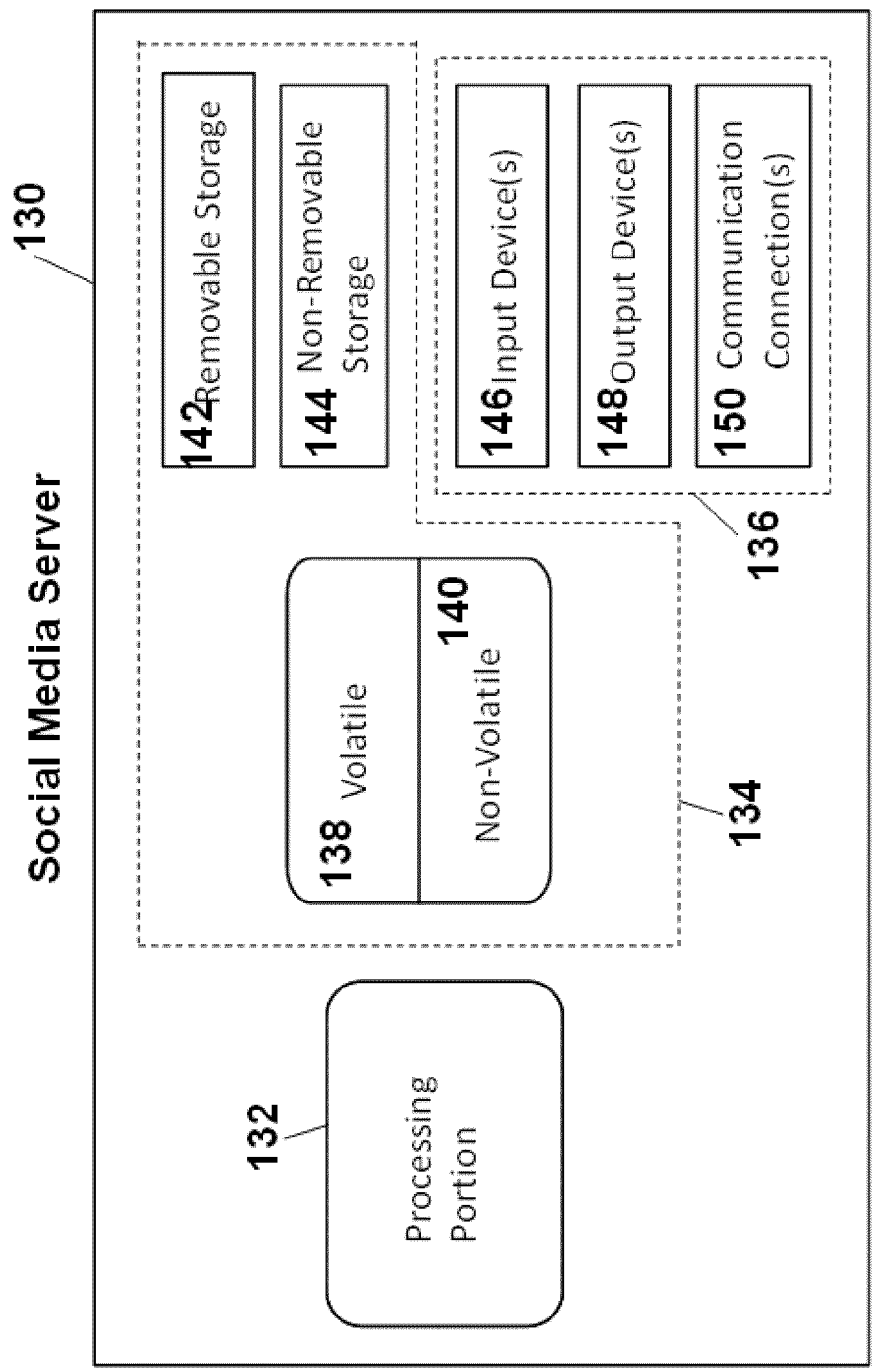
FIG. 11 illustrates diagram of an example social media server system for facilitating distribution of emergency alert messages via social media.

FIG. 11 is a diagram of an example social media server system 130 for facilitating distribution of emergency alert messages via social media. The system 130 may comprise hardware or a combination of hardware and software. The functionality needed to facilitate distribution and validation of emergency alert message services may reside in any one or combination of systems 130. The system 130 depicted in FIG. 3 may represent any appropriate system, or combination of apparatuses, such as a processor, a server, a gateway, a node, any appropriate entity, or any appropriate combination thereof. In an example embodiment, the system 130 may comprise the GPS combine and distribute system 12, the GPS combine and distribute system 50, or any appropriate combination thereof. It is emphasized that the block diagram depicted in FIG. 3 is exemplary and not intended to imply a specific implementation or configuration. Thus, the system 130 may be implemented in a single processor or multiple processors (e.g., single server or multiple servers, single gateway or multiple gateways, single system or multiple systems, etc.). Multiple systems may be distributed or centrally located. Multiple systems may communicate wirelessly, via hard wire, or a combination thereof.

In an example embodiment, the system 130 comprises a processor and memory coupled to the processor. The memory may comprise executable instructions that when executed by the processor cause the processor to effectuate operations associated with distribution and validation of emergency alert message services. As evident from the herein description, a system or any portion thereof is not to be construed as software per se.

In an example embodiment, the system 130 comprises a processor and memory coupled to the processor. The memory may comprise executable instructions that when executed by the processor cause the processor to effectuate operations associated with distribution and validation of emergency alert message services.

In an example configuration, the system 130 comprises a processing portion 132, a memory portion 134, and an input/output portion 136. The processing portion 132, memory portion 134, and input/output portion 136 are coupled together (coupling not shown in FIG. 9) to allow communications there between. The input/output portion 136 may be capable of receiving and/or providing information from/to a communications device and/or other network entities configured to be utilized with distribution and validation of emergency alert message services via social media. For example, the input/output portion 136 may include a wireless communications (e.g., 2.5G/3G/4G/GPS) card. The input/output portion 136 may be capable of receiving and/or sending video information, audio information, control information, image information, data, or any combination thereof. In an example embodiment, the input/output portion 36 may be capable of receiving and/or sending information to determine a location of the system 130 and/or the communications device 30. In an example configuration, the input\output portion 136 may comprise and/or be coupled to a GPS receiver. In an example configuration, the system 130 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 136 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 132 may be capable of performing functions associated with distribution and validation of emergency alert message services as described herein. That is, a communications device (e.g., communications device 120) may perform functions internally (by the device) and/or utilize the system 130 to perform functions. For example, the processing portion 132 may be capable of, in conjunction with any other portion of the system 130, installing an application for distribution and validation of emergency alert message services, processing an application for distribution and validation of emergency alert message services, configuring the system 130 to function as a gateway for other devices to a network, determining the location at which to provide distribution and validation of emergency alert message services, or the like, or any combination thereof. The processing portion 132, in conjunction with any other portion of the system 130, enables the system 130 to covert speech to text when it is configured to enhance location based services.

In a basic configuration, the system 130 may include at least one memory portion 134. The memory portion 134 may comprise a storage medium having a tangible physical structure. Thus, the memory portion 134, as well as any computer-readable storage medium described herein, is not to be construed as a transient signal per se. The memory portion 134, as well as any computer-readable storage medium described herein, is not to be construed as a propagating signal per se. The memory portion 134 may store any information utilized in conjunction with distribution and validation of emergency alert message services as described herein. Depending upon the exact configuration and type of processor, the memory portion 134 may be volatile 138 (such as some types of RAM), non-volatile 140 (such as ROM, flash memory, etc.), or a combination thereof. The system 130 may include additional storage (e.g., removable storage 142 and/or non-removable storage 144) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the system 130. One or more applications are loaded into mass memory and run on operating system. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Vitality Data Manager (VDM) may also be included as an application program within applications 350. VDM is configured to receive from a variety of sources information that may be associated with social networking activities of various social networking members. Such information may include but is not limited to various communications, including emails, SMS messages, IM messages, audio messages, VOIP messages, RSS feeds, membership information, calendar events, photo streams, photographs, blog updates, web pages, mood information, behaviors of social network members, or the like. VDM may aggregate or otherwise combine at least some of the received information to generate aggregate vitality information such as a mood of a group, organization, or the like, group events, albums, aggregate music selections, tags, or the like. VDM may also distribute at least some of the received and/or aggregated information to one or more social networking members, such as mobile devices and/or client device of FIG. 1 or the like. VDM may employ a process substantially similar to that described below in conjunction with FIG. 4.

The system 130 also may contain communications connection(s) 150 that allow the system 130 to communicate with other devices, systems, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The system 130 also can include input device(s) 146 such as keyboard, mouse, pen, voice input device, touch input device, etc. Output device(s) 148 such as a display, speakers, printer, etc. also can be included.

Figure 12:
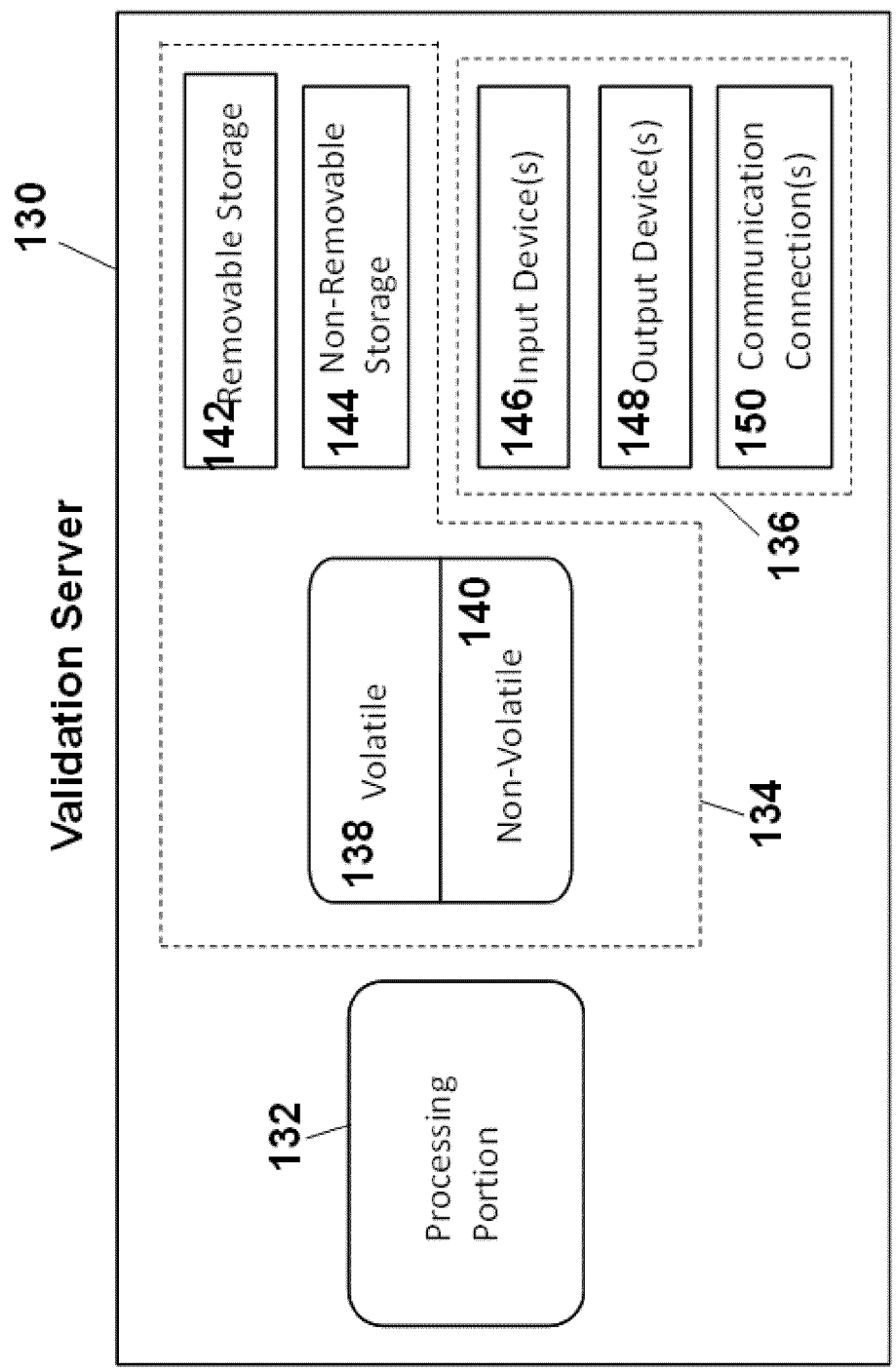
FIG. 12 illustrates diagram of an example validation server system for facilitating distribution of emergency alert messages via social media.

FIG. 12 is a diagram of an example validation server system 130 for facilitating distribution of emergency alert messages via social media. The system 130 may comprise hardware or a combination of hardware and software. The functionality needed to facilitate distribution and validation of emergency alert message services may reside in any one or combination of systems 130. The system 130 depicted in FIG. 3 may represent any appropriate system, or combination of apparatuses, such as a processor, a server, a gateway, a node, any appropriate entity, or any appropriate combination thereof. In an example embodiment, the system 130 may comprise the GPS combine and distribute system 12, the GPS combine and distribute system 50, or any appropriate combination thereof. It is emphasized that the block diagram depicted in FIG. 3 is exemplary and not intended to imply a specific implementation or configuration. Thus, the system 130 may be implemented in a single processor or multiple processors (e.g., single server or multiple servers, single gateway or multiple gateways, single system or multiple systems, etc.). Multiple systems may be distributed or centrally located. Multiple systems may communicate wirelessly, via hard wire, or a combination thereof.

In an example embodiment, the system 130 comprises a processor and memory coupled to the processor. The memory may comprise executable instructions that when executed by the processor cause the processor to effectuate operations associated with distribution and validation of emergency alert message services. As evident from the herein description, a system or any portion thereof is not to be construed as software per se.

In an example embodiment, the system 130 comprises a processor and memory coupled to the processor. The memory may comprise executable instructions that when executed by the processor cause the processor to effectuate operations associated with distribution and validation of emergency alert message services.

In an example configuration, the system 130 comprises a processing portion 132, a memory portion 134, and an input/output portion 136. The processing portion 132, memory portion 134, and input/output portion 136 are coupled together (coupling not shown in FIG. 9) to allow communications there between. The input/output portion 136 may be capable of receiving and/or providing information from/to a communications device and/or other network entities configured to be utilized with distribution and validation of emergency alert message services via social media. For example, the input/output portion 136 may include a wireless communications (e.g., 2.5G/3G/4G/GPS) card. The input/output portion 136 may be capable of receiving and/or sending video information, audio information, control information, image information, data, or any combination thereof. In an example embodiment, the input/output portion 36 may be capable of receiving and/or sending information to determine a location of the system 130 and/or the communications device 30. In an example configuration, the input\output portion 136 may comprise and/or be coupled to a GPS receiver. In an example configuration, the system 130 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 136 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 132 may be capable of performing functions associated with distribution and validation of emergency alert message services as described herein. That is, a communications device (e.g., communications device 120) may perform functions internally (by the device) and/or utilize the system 130 to perform functions. For example, the processing portion 132 may be capable of, in conjunction with any other portion of the system 130, installing an application for distribution and validation of emergency alert message services, processing an application for distribution and validation of emergency alert message services, configuring the system 130 to function as a gateway for other devices to a network, determining the location at which to provide distribution and validation of emergency alert message services, or the like, or any combination thereof. The processing portion 132, in conjunction with any other portion of the system 130, enables the system 130 to covert speech to text when it is configured to enhance location based services.

In a basic configuration, the system 130 may include at least one memory portion 134. The memory portion 134 may comprise a storage medium having a tangible physical structure. Thus, the memory portion 134, as well as any computer-readable storage medium described herein, is not to be construed as a transient signal per se. The memory portion 134, as well as any computer-readable storage medium described herein, is not to be construed as a propagating signal per se. The memory portion 134 may store any information utilized in conjunction with distribution and validation of emergency alert message services as described herein. Depending upon the exact configuration and type of processor, the memory portion 134 may be volatile 138 (such as some types of RAM), non-volatile 140 (such as ROM, flash memory, etc.), or a combination thereof. The system 130 may include additional storage (e.g., removable storage 142 and/or non-removable storage 144) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the system 130. One or more applications are loaded into mass memory and run on operating system. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Vitality Data Manager (VDM) may also be included as an application program within applications 350. VDM is configured to receive from a variety of sources information that may be associated with social networking activities of various social networking members. Such information may include but is not limited to various communications, including emails, SMS messages, IM messages, audio messages, VOIP messages, RSS feeds, membership information, calendar events, photo streams, photographs, blog updates, web pages, mood information, behaviors of social network members, or the like. VDM may aggregate or otherwise combine at least some of the received information to generate aggregate vitality information such as a mood of a group, organization, or the like, group events, albums, aggregate music selections, tags, or the like. VDM may also distribute at least some of the received and/or aggregated information to one or more social networking members, such as mobile devices and/or client device of FIG. 1 or the like. VDM may employ a process substantially similar to that described below in conjunction with FIG. 4.

The system 130 also may contain communications connection(s) 150 that allow the system 130 to communicate with other devices, systems, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The system 130 also can include input device(s) 146 such as keyboard, mouse, pen, voice input device, touch input device, etc. Output device(s) 148 such as a display, speakers, printer, etc. also can be included.

Figure 13:
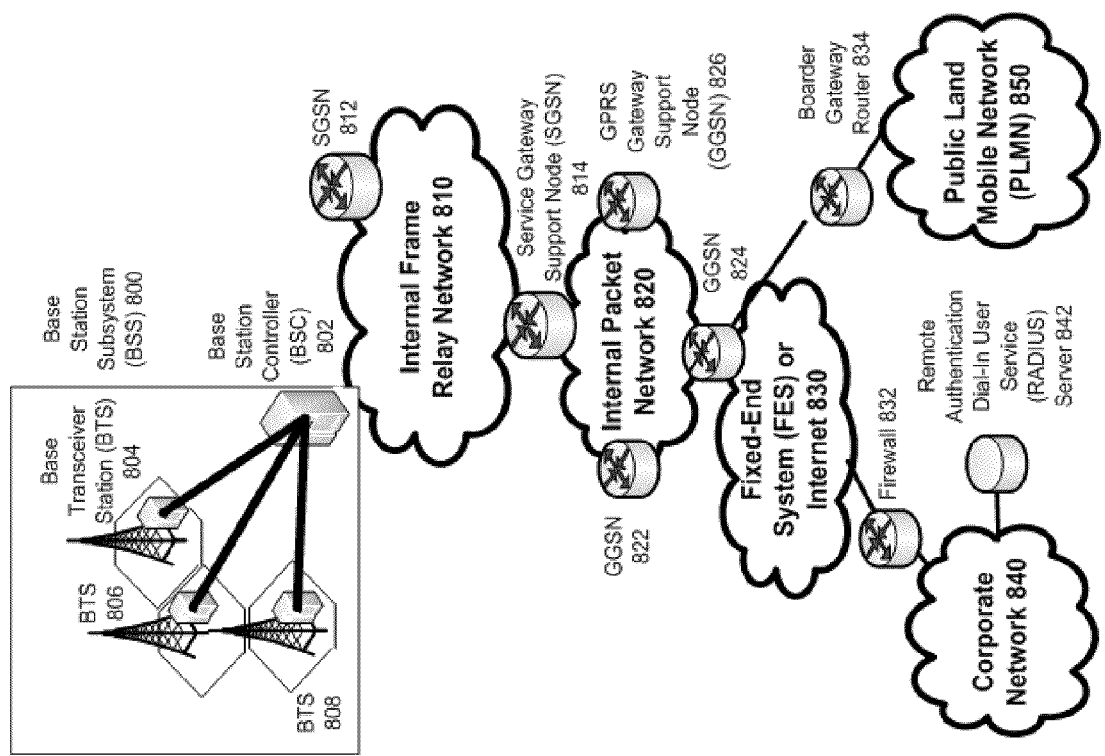
FIG. 13 illustrates an overall block diagram of an example packet-based mobile cellular network environment, such as a GPRS network, within which distribution and validation of emergency alert message services may be implemented.

FIG. 13 depicts an overall block diagram of an example packet-based mobile cellular network environment, such as a GPRS network, within which distribution and validation of emergency alert message services may be implemented. In the example packet-based mobile cellular network environment shown in FIG. 10, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 14:
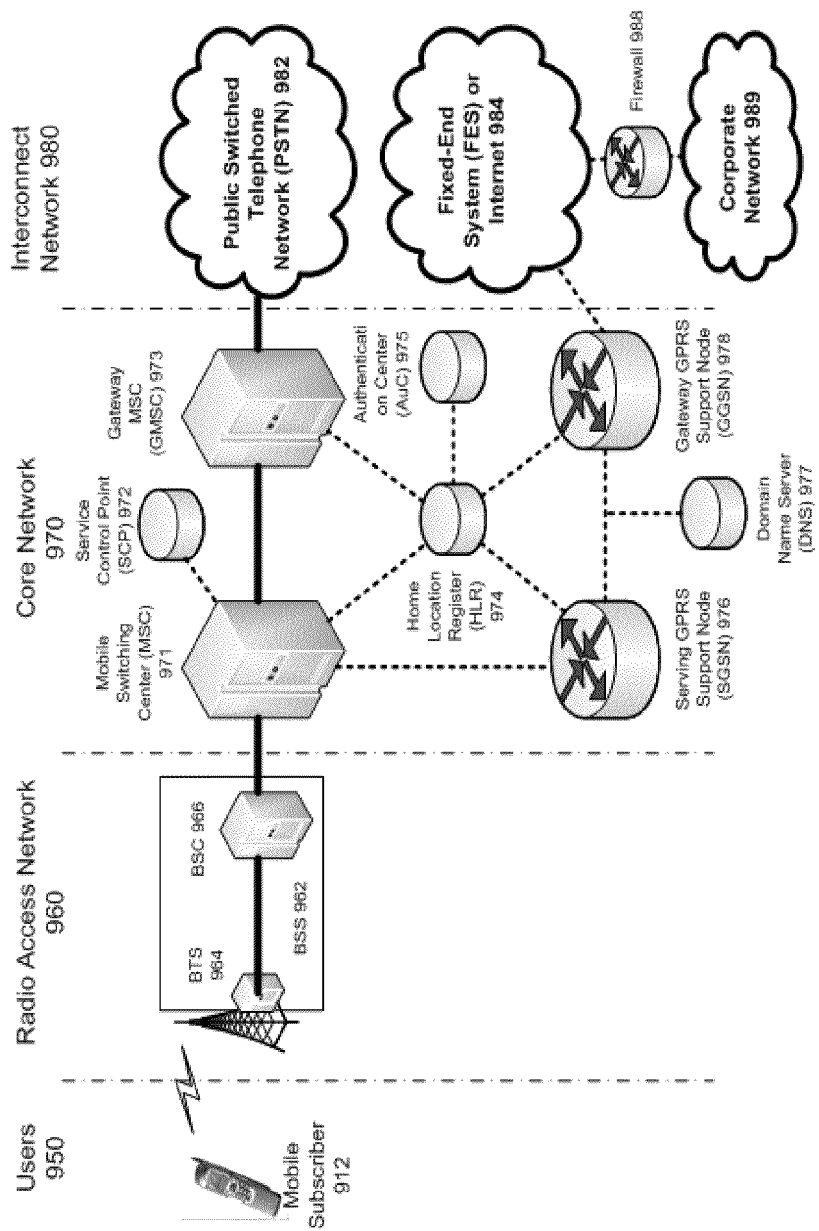
FIG. 14 illustrates an architecture of a typical GPRS network within which text message generation for emergency services can be implemented.

FIG. 14 illustrates an architecture of a typical GPRS network within which text message generation for emergency services can be implemented. The architecture depicted in FIG. 11 is segmented into four groups: users 950, radio access network 960, core network 970, and interconnect network 980. Users 950 comprise a plurality of end users. Note, device 912 is referred to as a mobile subscriber in the description of network shown in FIG. 11. In an example embodiment, the device depicted as mobile subscriber 912 comprises a communications device (e.g., communications device 160). Radio access network 960 comprises a plurality of base station subsystems such as BSSs 962, which include BTSs 964 and BSCs 966. Core network 970 comprises a host of various network elements. As illustrated in FIG. 11, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 11, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 11, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 15:
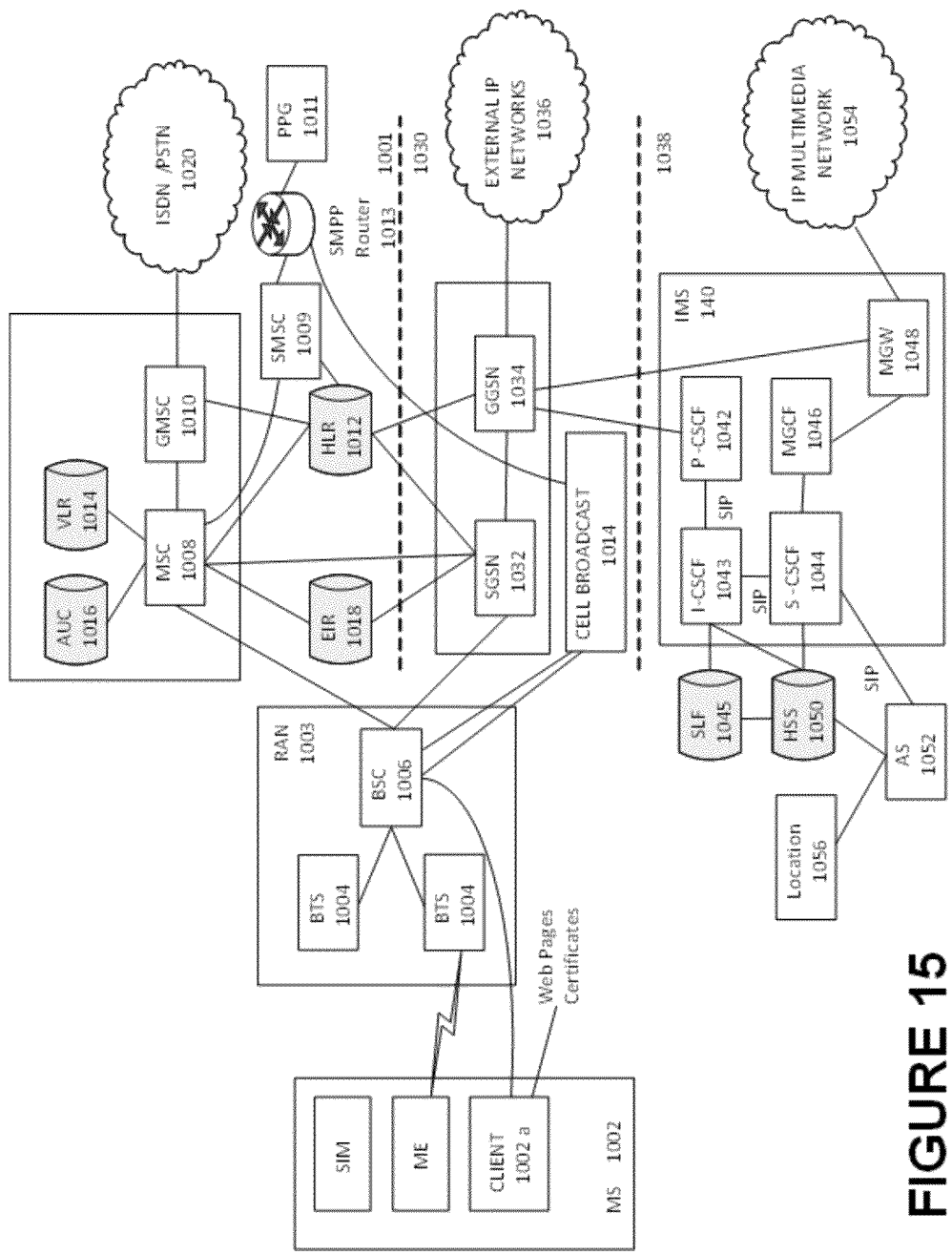
FIG. 15 illustrates an example block diagram view of a GSM/GPRS/IP multimedia network architecture within which text message generation for emergency services may be implemented.

FIG. 15 illustrates an example block diagram view of a GSM/GPRS/IP multimedia network architecture within which text message generation for emergency services may be implemented. As illustrated, the architecture of FIG. 12 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 16:
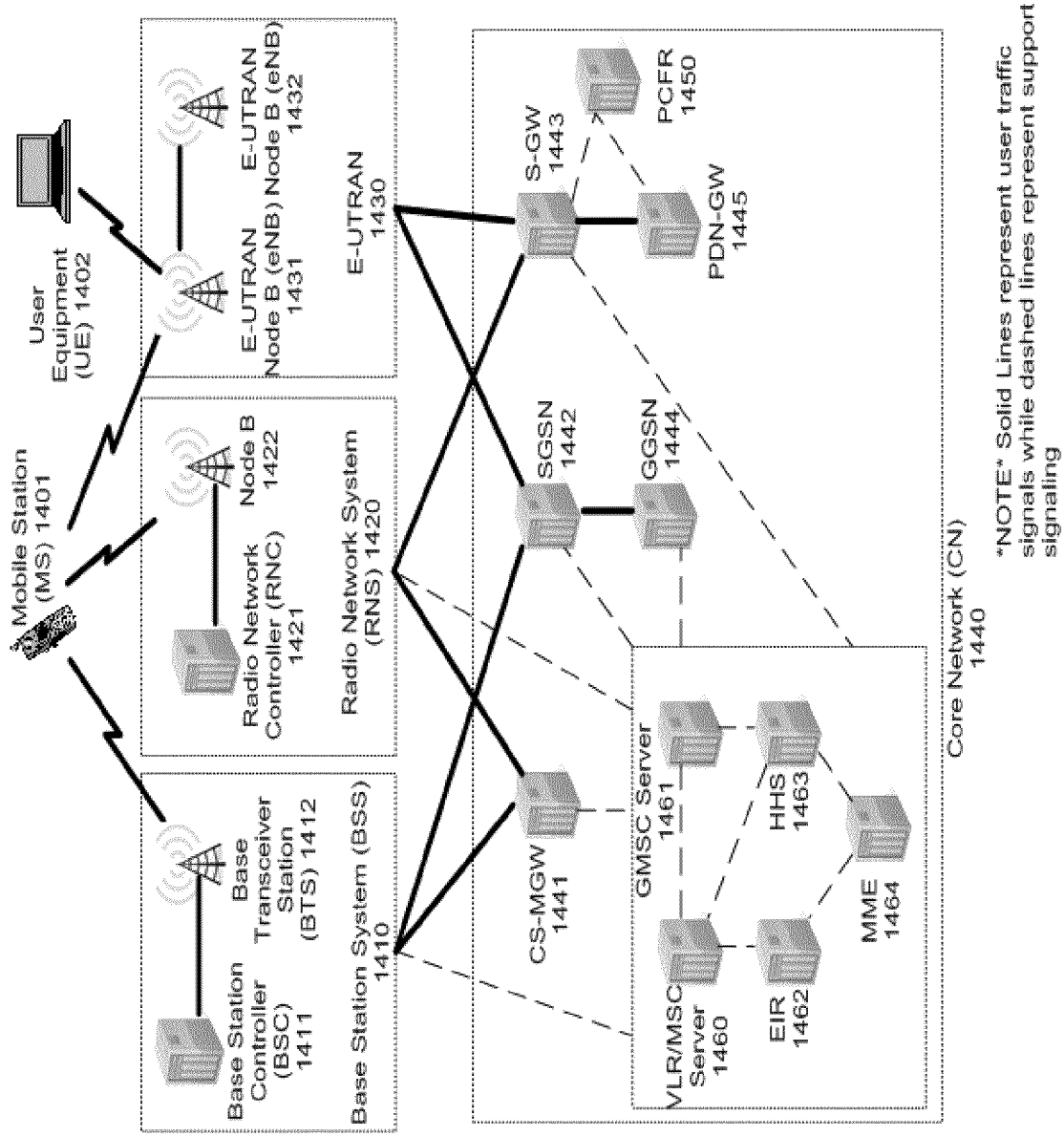
FIG. 16 illustrates a PLMN block diagram view of an example architecture in which text message generation for emergency services may be incorporated.

FIG. 16 illustrates a PLMN block diagram view of an example architecture in which text message generation for emergency services may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 13 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of distribution and validation of emergency alert message via social media have been described in connection with various computing devices/processors, the underlying concepts may be applied to any computing device, processor, or system capable of implementing distribution and validation of emergency alert message via social media. The various techniques described herein may be implemented in connection with hardware or software or, where appropriate, with a combination of both. Thus, the methods and apparatuses of using and implementing distribution and validation of emergency alert message via social media may be implemented, or certain aspects or portions thereof, can take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. A computer-readable storage medium is not a propagating signal per se. When the program code is loaded into and executed by a machine, such as a computer, the machine becomes an apparatus for implementing distribution and validation of emergency alert message services. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing operations for facilitating distribution of emergency alert messages via social media also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing distribution and validation of emergency alert message services. When implemented on a general-purpose processor, the program code combines with the processor to provide a unique apparatus that operates to invoke the functionality of distribution and validation of emergency alert message via social media.

While operations for facilitating distribution of emergency alert messages via social media have been described in connection with the various embodiments of the various figures, it is to be understood that other similar embodiments can be used or modifications and additions can be made to the described embodiments for implementing distribution and validation of emergency alert message via social media without deviating therefrom. For example, one skilled in the art will recognize that distribution and validation of emergency alert message services as described in the present application may apply to any environment, whether wired or wireless, and may be applied to any number of such devices connected via a communications network and interacting across the network. Therefore, distribution and validation of emergency alert messages via social media should not be limited to any single embodiment, but rather should be construed in breadth and scope in accordance with the appended claims.

What is claimed:

1. A method comprising:
   receiving, by a server, an indication of an emergency;
   generating, by the server, an emergency alert message associated with the emergency, wherein the emergency alert message is determined by analyzing first information posted on a social media;
   distributing, by the server, the emergency alert message via the social media;
   receiving second information associated with the distributed emergency alert message via the social media, the second information comprising a determination of trustworthiness of the distributed emergency alert message, wherein the trustworthiness of the distributed emergency alert message is based on a user feedback from the recipients of the distributed emergency alert message via the social media, the user feedback comprises a vote;
   updating the emergency alert message based on analyzing the second information gathered subsequent to the first information on the social media; and
   displaying a map, the map based on the updated emergency alert message.

2. The method of claim 1, wherein:
   the emergency alert message comprises an indication of trustworthiness based on information obtained from a plurality of social media.

3. The method of claim 1, wherein:
   the emergency alert message comprises an indication of trustworthiness based on information obtained from a plurality of sources.

4. The method of claim 1, wherein:
   the emergency alert message comprises an indication of trustworthiness, wherein the indication of trustworthiness comprises a token.

5. The method of claim 1, wherein:
   the updated emergency alert message comprises an updated indication of trustworthiness; and,
   the updated indication of trustworthiness is indicative of being based on feedback received from a recipient of the emergency alert message.

6. The method of claim 1, wherein:
   the emergency alert message is based on information obtained from a plurality of social media.

7. The method of claim 1, wherein:
   the updated emergency alert message is indicative of being based on feedback received from a recipient of the emergency alert message.

8. The method of claim 1, wherein:
   the emergency alert message comprises an indication of trustworthiness for third-party validation of the emergency alert message.

9. The method of claim 1, wherein:
   the emergency alert message comprises an indication of trustworthiness of the emergency alert message.

10. The method of claim 1, wherein:
    the emergency alert message comprises an indication of trustworthiness of a source of the emergency alert message.

11. A computer-readable storage medium comprising executable instructions that when executed by a processor cause the processor to effectuate operations comprising:
    receiving an indication of an emergency;
    generating an emergency alert message associated with the emergency, wherein the emergency alert message is determined by analyzing first information posted on a social media;
    distributing the emergency alert message via the social media;
    receiving second information associated with the distributed emergency alert message via the social media, the second information comprising a determination of trustworthiness of the distributed emergency alert message, wherein the trustworthiness of the distributed emergency alert message is based on a user feedback from the recipients of the distributed emergency alert message via the social media;
    updating the emergency alert message based on analyzing the second information gathered subsequent to the first information on the social media; and
    providing to a display a map based on the updated emergency alert message.

12. The computer-readable storage medium of claim 11, wherein the emergency alert message comprises an indication of trustworthiness based on information obtained from a plurality of social media.

13. The computer-readable storage medium of claim 11, wherein the emergency alert message comprises an indication of trustworthiness, wherein the indication of trustworthiness comprises a token.

14. The computer-readable storage medium of claim 11, wherein:
    the updated emergency alert message comprises an updated indication of trustworthiness, the updated indication of trustworthiness is indicative of being based on feedback received from a recipient of the emergency alert message.

15. The computer-readable storage medium of claim 11, wherein:
the emergency alert message is based on information obtained from a plurality of social media.

16. The computer-readable storage medium of claim 11, the operations further comprising:
updating the emergency alert message, wherein:
the updated emergency alert message is indicative of being based on feedback received from a recipient of the emergency alert message.

17. The computer-readable storage medium of claim 11, wherein:
the emergency alert message comprises an indication of trustworthiness for third-party validation of the emergency alert message.

18. A device comprising:
a processor; and
memory coupled to the processor, the memory comprising executable instructions that when executed by the processor cause the processor to effectuate operations comprising:
receiving, by the processor, an indication of an emergency;
generating, by the processor, an emergency alert message associated with the emergency, wherein the emergency alert message is determined by analyzing first information posted on a social media;
distributing the emergency alert message via the social media;
receiving second information associated with the distributed emergency alert message via the social media, the second information comprising a determination of trustworthiness of the distributed emergency alert message, wherein the trustworthiness of the distributed emergency alert message is based on a vote from the recipients of the distributed emergency alert message via the social media;
updating the emergency alert message based on analyzing the second information gathered subsequent to the first information on the social media; and
providing to a display a map based on the updated emergency alert message.

19. The device of claim 18, wherein:
the updated emergency alert message comprises an updated indication of trustworthiness, the updated indication of trustworthiness is indicative of being based on feedback received from a recipient of the emergency alert message.

20. The device of claim 18, wherein:
the updated emergency alert message is indicative of being based on feedback received from a recipient of the emergency alert message.

* * * * *